(12) United States Patent
Cooke et al.

(10) Patent No.: US 6,458,458 B1
(45) Date of Patent: Oct. 1, 2002

(54) POLYMER COATED CARBON PRODUCTS AND OTHER PIGMENTS AND METHODS OF MAKING SAME BY AQUEOUS MEDIA POLYMERIZATIONS OR SOLVENT COATING METHODS

(75) Inventors: Joel M. Cooke, Nashua, NH (US); Charles H. Honeyman, Boston; Robert M. Amici, Berlin, both of MA (US); Peter A. Lovell, Appleton; John L. Stanford, Urmston, both of (GB); Rosa Casado Portilla, Bilbao (ES)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 09/317,706

(22) Filed: May 24, 1999

Related U.S. Application Data

(60) Provisional application No. 60/104,117, filed on Oct. 13, 1998.

(51) Int. Cl.⁷ ................................................. B32B 9/00
(52) U.S. Cl. ........................ 428/407; 428/408; 428/403
(58) Field of Search ................................. 428/408, 407, 428/403, 402

(56) References Cited

U.S. PATENT DOCUMENTS

| | | | |
|---|---|---|---|
| 2,439,442 A | 4/1948 | Amon et al. | 23/209.1 |
| 2,502,254 A | 3/1950 | Glassman | 106/289 |
| 2,514,236 A | 7/1950 | Glassman | 106/289 |

(List continued on next page.)

FOREIGN PATENT DOCUMENTS

| | | | |
|---|---|---|---|
| EP | 0 054 904 | 6/1982 | |
| EP | 0 247 782 | 12/1987 | |
| EP | 0 437 105 A1 | 7/1991 | |
| EP | 0 475 075 A1 | 3/1992 | C09D/11/00 |
| EP | 0 529 162 A1 | 3/1993 | |
| FR | 2 393 036 | 6/1978 | |
| FR | 2 442 258 | 6/1980 | |
| GB | 2 036 779 | 7/1980 | |
| JP | 90-0134478 | 1/1992 | |
| JP | 6-128517 | 5/1994 | |
| JP | 96-0105108 | 11/1997 | |
| WO | WO 96/18688 | 6/1996 | |
| WO | WO 96/18695 | 6/1996 | |
| WO | WO 96/18696 | 6/1996 | |
| WO | WO 97/48769 | 12/1997 | |
| WO | WO 98/13428 | 4/1998 | |
| WO | WO 99/10436 | 3/1999 | |
| WO | WO 99/23182 | 5/1999 | |
| WO | WO 99/31175 | 6/1999 | |
| WO | WO 01/55254 | 8/2001 | C08K/9/04 |

OTHER PUBLICATIONS

International Search Report for PCT/US 99/23429 Mailed Jan. 28, 2000.
PCT Written Opinion mailed Dec. 13, 2001.
Derwent Abstract No. 82–28019E (Oct. 17, 1979) "Penetrate Flexographic Print Ink Based Polyacrylic Resin Modified Maleinised Rosin Modified Carbon Black".

*Primary Examiner*—Deborah Jones
*Assistant Examiner*—Wendy Boss

(57) ABSTRACT

A polymer coated modified carbon product is described wherein the polymer at least partially coats a modified carbon product. The modified product preferably has at least one organic group attached to the carbon product and the organic group is preferably substituted with an ionic, ionizable, or polar group for preparation in polar or aqueous based media. Methods of making the polymer coated modified carbon product are also described, such as by aqueous-based or solvent free polymerization methods, organic solvent based polymerization methods, or solution coating methods. Polymeric products and masterbatches containing the polymer coated modified carbon products are also described as well as methods to improve properties such as impact properties and tensile properties. Polymer coated modified colored pigments, methods of making the same, and polymeric products and masterbatches containing polymer coated modified colored pigments are also described.

52 Claims, 3 Drawing Sheets

U.S. PATENT DOCUMENTS

| | | | |
|---|---|---|---|
| 2,867,540 A | 1/1959 | Harris .................. 106/307 |
| 3,025,259 A | 3/1962 | Watson et al. ............. 260/41.5 |
| 3,043,708 A | 7/1962 | Watson et al. ............. 106/307 |
| 3,271,354 A | 9/1966 | Weissert et al. ............. 260/41 |
| 3,335,020 A | 8/1967 | Aboytes et al. ............. 106/307 |
| 3,471,439 A | 10/1969 | Bixler et al. .................. 260/41 |
| 3,479,300 A | 11/1969 | Rivin et al. .................. 252/430 |
| 3,755,244 A | 8/1973 | Hart .................. 260/41 R |
| 3,884,871 A | 5/1975 | Herman et al. ............ 260/42.14 |
| 4,014,844 A | 3/1977 | Vidal et al. ............... 260/31.2 |
| 4,871,371 A | 10/1989 | Harris ........................ 8/403 |
| 4,880,857 A | 11/1989 | Mori et al. .................. 523/205 |
| 4,946,509 A | 8/1990 | Schwartz et al. ........... 106/496 |
| 5,281,261 A | 1/1994 | Lin ............................. 106/20 |
| 5,298,356 A | 3/1994 | Tyagi et al. ................. 430/110 |
| 5,554,739 A | 9/1996 | Belmont ..................... 534/885 |
| 5,559,169 A | 9/1996 | Belmont et al. ............ 523/215 |
| 5,571,311 A | 11/1996 | Belmont et al. ............. 106/20 |
| 5,630,868 A | 5/1997 | Belmont et al. ......... 106/31.75 |
| 5,672,198 A * | 9/1997 | Belmont |
| 5,698,016 A | 12/1997 | Adams et al. ............... 106/316 |
| 5,747,559 A | 5/1998 | Whitehouse et al. ....... 523/205 |
| 5,749,950 A | 5/1998 | Mahmud et al. ............ 106/316 |
| 5,783,614 A | 7/1998 | Chen et al. .................. 523/205 |
| 5,803,959 A | 9/1998 | Johnson et al. ........... 106/31.75 |
| 5,807,494 A | 9/1998 | Boes et al. .................... 252/62 |
| 5,837,045 A | 11/1998 | Johnson et al. ........... 106/31.85 |
| 5,851,280 A | 12/1998 | Belmont et al. ............. 106/472 |
| 5,869,550 A | 2/1999 | Mahmud et al. ............ 523/215 |
| 5,871,706 A | 2/1999 | Whitehouse et al. .... 423/449.2 |
| 5,872,177 A | 2/1999 | Whitehouse ................. 524/495 |
| 5,919,855 A | 7/1999 | Reed .......................... 524/496 |
| 5,930,026 A | 7/1999 | Jacobson et al. ............ 359/296 |
| 5,932,633 A | 8/1999 | Chen et al. .................. 523/205 |
| 5,952,429 A * | 9/1999 | Ikeda et al. |
| 5,961,804 A | 10/1999 | Jacobson et al. ............ 204/606 |
| 5,964,935 A | 10/1999 | Chen et al. .................. 106/401 |
| 5,990,202 A | 11/1999 | Nguyen et al. .............. 523/201 |
| 6,017,584 A | 1/2000 | Albert et al. ............. 427/213.3 |
| 6,017,980 A * | 1/2000 | Wang et al. |
| 6,020,063 A * | 2/2000 | Riffle et al. |
| 6,020,068 A * | 2/2000 | Kawazura et al. |
| 6,069,190 A * | 5/2000 | Bates et al. |
| 6,103,380 A * | 8/2000 | Devonport |
| 6,103,782 A * | 8/2000 | Mizobuchi et al. |
| 6,110,994 A * | 8/2000 | Cooke et al. |
| 6,169,129 B1 * | 1/2001 | Mahmud et al. |
| 6,187,439 B1 * | 2/2001 | Elwakil |

\* cited by examiner

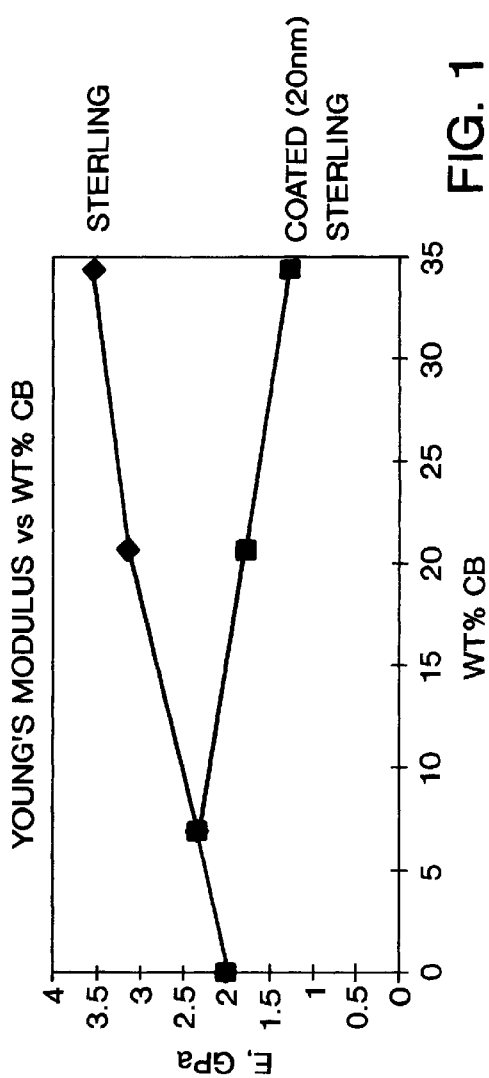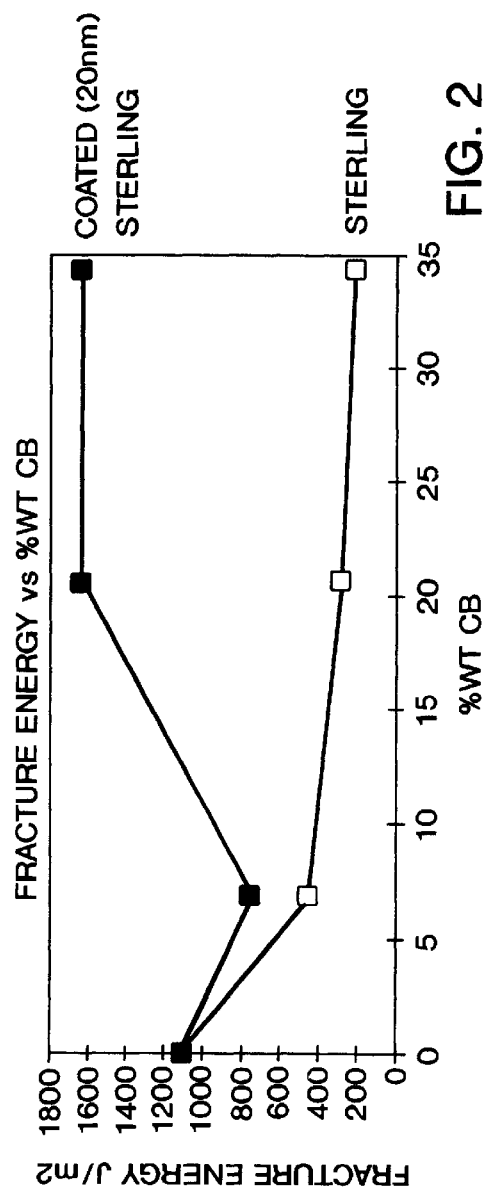

Variation of fraction energy, $G_{IC}$, with weight percentage, wt(CB), of carbon black (a) R-nf-0 and R-NH$_2$-20(BA), (b) S-nf-0 and S-NH$_2$-20(BA) and (c) S-nf-0 and E-100A-10

POLYMER COATED CARBON PRODUCTS AND OTHER PIGMENTS AND METHODS OF MAKING SAME BY AQUEOUS MEDIA POLYMERIZATIONS OR SOLVENT COATING METHODS

This application claims the benefit of U.S. Provisional Application No. 60/104,117, filed Oct. 13, 1998.

BACKGROUND OF THE INVENTION

The present invention relates to carbon products and other pigments and polymers and more particularly relates to the coating of pigment products with polymers. The present invention further relates to the use of aqueous media polymerizations such as emulsion or suspension techniques or solvent based procedures to coat, at least partially, carbon products, such as carbon black and other pigments.

Carbon products, and more specifically, carbon black have been used in a variety of areas as a filler and/or reinforcer. While carbon black can advantageously contribute to the properties of various polymers in which it is present in, carbon black has been shown to contribute to certain detrimental properties such as impact properties, including tensile properties and stress and strain-related properties. In addition, carbon black when included in the polymers is usually added with the use of masterbatches since carbon black can be difficult to disperse in polymers due to its physical properties such as small primary particle size and highly structured aggregates.

Accordingly, developing means to overcome one or more of these above-described problems would be desirable.

SUMMARY OF TH INVENTION

In an embodiment of the present invention, the present invention relates to a polymer coated modified carbon product, wherein the polymer at least partially coats a modified carbon product. Preferably, the modified carbon product has at least one organic group attached to the carbon product. The organic group is preferably substituted with an ionic, ionizable, or polar groups which can facilitate the formation of a stable dispersion in an aqueous media. In this embodiment, the polymer partially or fully encapsulates the modified carbon product, or the modified carbon product is the core and the polymer is the shell.

The present invention further relates to a method of making a polymer coated modified carbon product which includes the steps of combining, in an aqueous-based medium, an initiator, at least one monomer, and a modified carbon product. The modified carbon product preferably has at least one organic group attached to the carbon product. Again, the organic group is preferably substituted with an ionic, ionizable, or polar group. The initiator, at least one monomer, and the modified carbon product are then subjected to an emulsion, suspension, or other aqueous based polymerization to form a polymer coated modified carbon product, wherein the monomer is capable of being polymerized in an aqueous environment and the modified carbon product is dispersible or dispersed in the aqueous-based medium. This method also relates to the use of a modified carbon product which can form stable aqueous dispersions and can also physically and/or chemically bond to the polymer formed during the polymerization of the monomers.

The present invention, in addition, relates to a method of making a polymer coated modified carbon product such as that described above, wherein a polymer is prepared separately and is then dissolved in an appropriate organic solvent. A modified carbon product is then combined with the solvent containing the polymer, followed by the removal of the solvent, such as by evaporation or other means.

Further, the present invention relates to a method of making a polymer coated modified carbon product such as that described above, wherein a polymerizable monomer is present in an organic solvent and a modified carbon product is then combined with the solvent containing the monomer, followed by polymerization of the monomer and subsequent removal of the solvent.

The present invention also relates to polymer coated modified pigments.

It is to be understood that both the foregoing general description and the following detailed description are exemplary and explanatory only and are intended to provide further explanation of the present invention, as claimed.

BRIEF DESCRIPTION OF THE DRAWINGS

FIG. 1 is a graph plotting the Young's Modulus vs weight % of carbon black or polymer coated (20 nm) modified carbon black of the present invention.

FIG. 2 is a graph plotting the Fracture Energy vs weight % of carbon black or a polymer coated (20 nm) modified carbon black of the present invention.

DERAILED DESCRIPTION OF THE PRESENT INVENTION

Figure 3:
FIGS. 3 and 4 are microphotographs of polymer coated modified carbon products of the present invention.

In an embodiment of the present invention, the present invention relates to a polymer coated modified carbon product. The modified carbon product is at least partially coated with one or more polymers and can be substantially or fully coated by one or more polymers. The use of the term "coated" includes partially and fully coated carbon products and modified carbon products. The polymer in this invention, partially or fully encapsulates the modified carbon product, wherein the modified carbon product is the core and the polymer is the shell. The polymer(s) coated onto or used to encapsulate the modified carbon product is preferably present on the modified carbon product such that the polymer(s) is not substantially extractable by an organic solvent. More preferably, the polymer(s) on the modified carbon product is attached by physical (e.g., adsorption) and/or chemical means (e.g. chemical bonding, grafting).

The carbon product coated with a polymer can be a modified carbon product having at least one organic group attached to the carbon product. Preferably, the organic group is substituted with an ionic, ionizable, or polar group. The carbon product which as the organic group attached thereto can be any carbon product capable of having at least one organic group attached to the carbon product. For instance, the carbon product can be any carbon product capable of reacting with the diazonium salt to form the modified carbon product. The carbon may be of the crystalline or amorphous type. Examples include, but are not limited to, graphite, carbon black, vitreous carbon, activated charcoal, activated carbon, carbon fibers, and mixtures thereof. Finely divided forms of the above are preferred. It is also possible to utilize mixtures of different carbon products.

Also, for purposes of the present invention, a modified carbon product includes an aggregate comprising a carbon phase and a silicon-containing species phase. A description of this aggregate as well as means of making this aggregate are described in PCT Publication No. WO 96/37547 as well as U.S. patent application Ser. No. 08/446,141 (now U.S. Pat. No. 5,830,930); Ser. Nos. 08/446,142; 08/528,895; 08/750,017; and 09/061,871. This modified carbon product can be used as is or can have an organic group attached thereto. All of these patents, publications, and patent applications are hereby incorporated in their entireties herein by reference.

The modified carbon product, for purposes of the present invention, can also be an aggregate comprising a carbon phase and metal-containing species phase where the metal-containing species phase can be a variety of different metals such as magnesium, calcium, titanium, vanadium, cobalt, nickel, zirconium, tin, antimony, chromium, neodymium, lead, tellurium, barium, cesium, iron, molybdenum, aluminum, and zinc, and mixtures thereof. The aggregate comprising the carbon phase and a metal-containing species phase is described in U.S. patent application Ser. No. 08/828,785 filed Mar. 27, 1997, also hereby incorporated in its entirety herein by reference. This carbon product can be used as is or can have an organic group attached thereto.

Also, for purposes of the present invention, a modified carbon product includes a silica-coated carbon black, such as that described in PCT Publication No. WO 96/37547, published Nov. 28, 1996, also hereby incorporated in its entirety herein by reference. This modified carbon product can be used as is or can have an organic group attached thereto.

One process for attaching an organic group to the carbon product involves the reaction of at least one diazonium salt with a carbon product in the absence of an externally applied current sufficient to reduce the diazonium salt. That is, the reaction between the diazonium salt and the carbon product proceeds without an external source of electrons sufficient to reduce the diazonium salt. Mixtures of different diazonium salts may be used in the process of the invention. This process can be carried out under a variety of reaction conditions and in any type of reaction medium, including both protic and aprotic solvent systems or slurries.

In another process, at least one diazonium salt reacts with a carbon product in a protic reaction medium. Mixtures of different diazonium salts may be used in this process of the invention. This process can also be carried out under a variety of reaction conditions.

In both processes, the diazonium salt can be formed in situ. If desired, in either process, the carbon product can be isolated and dried by means known in the art. Furthermore, the resultant carbon product can be treated to remove impurities by known techniques.

The processes can be carried out in any reaction medium which allows the reaction between the diazonium salt and the carbon product to proceed. The reaction medium can be a solvent-based system. The solvent may be a protic solvent, an aprotic solvent, or a mixture of solvents. Protic solvents are solvents, like water or methanol, containing a hydrogen attached to an oxygen or nitrogen and thus are sufficiently acidic to form hydrogen bonds. Aprotic solvents are solvents which do not contain an acidic hydrogen as defined above. Aprotic solvents include, for example, solvents such as hexanes, tetrahydrofuran (THF), acetonitrile, and benzonitrile. For a discussion of protic and aprotic solvents see Morrison and Boyd, *Organic Chemistry*, 5th Ed., pp. 228–231, (Allyn and Bacon, Inc. 1987).

The reaction between a diazonium salt and a carbon product can take place with any type of carbon product, for example, in fluffy or pelleted form.

The reaction between a diazonium salt and a carbon product forms a modified carbon product having an organic group attached to the carbon product. The diazonium salt may contain the organic group to be attached to the carbon product. It may be possible to produce the modified carbon products used in this invention by other means known to those skilled in th& art.

The organic group be an aliphatic group, a cyclic organic group, or an organic compound having an aliphatic portion and a cyclic portion. The diazonium salt employed in the processes can be derived from a primary amine having one of these groups and being capable of forming, even transiently, a diazonium salt. The organic group may be substituted or unsubstituted, branched or unbranched. Aliphatic groups include, for example, groups derived from alkanes, alkenes, alcohols, ethers, aldehydes, ketones, carboxylic acids, and carbohydrates. Cyclic organic groups include, but are not limited to, alicyclic hydrocarbon groups (for example, cycloalkyls, cycloalkenyls), heterocyclic hydrocarbon groups (for example, pyrrolidinyl, pyrrolinyl, piperidinyl, morpholinyl, and the like), aryl groups (for example, phenyl, naphthyl, anthracenyl, and the like), and heteroaryl groups (imidazolyl, pyrazolyl, pyridinyl, thienyl, thiazolyl, furyl, indolyl, and the like). As the steric hinderance of a substituted organic group increases, the number of organic groups attached to the carbon product from the reaction between the diazonium salt and the carbon product may be diminished.

When the organic group is substituted, it may contain any functional group compatible with the formation of a diazonium salt. Functional groups include, but are not limited to, R, OR, COR, COOR, OCOR, carboxylate salts such as COOLi, COONa, COOK, COO$^-$NR$_4^+$, halogen, CN, NR$_2$, SO$_3$H, sulfonate salts such as SO$_3$Li, SO$_3$Na, SO$_3$K, SO$_3^-$NR$_4^+$, OSO$_3$H, OSO$_3^-$ salts, NR(COR), CONR$_2$, NO$_2$, PO$_3$H$_2$, phosphonate salts such as PO$_3$HNa and PO$_3$Na$_2$, phosphate salts such as OPO$_3$HNa and OPO$_3$Na$_2$, N=NR, NR$_3^+$X$^-$, PR$_3^+$X$^-$, S$_k$R, SSO$_3$H, SSO$_3^-$ salts, SO$_2$NRR', SO$_2$SR, SNRR', SNQ, SO$_2$NQ, CO$_2$NQ, S-(1,4-piperazinediyl)-SR, 2-(1,3-dithianyl) 2-(1,3-dithiolanyl), SOR, and SO$_2$R. R and R', which can be the same or different, are independently hydrogen, branched or unbranched C$_1$–C$_{20}$ substituted or unsubstituted, saturated or unsaturated hydrocarbon, e.g., alkyl, alkenyl, alkynyl, substituted or unsubstituted aryl, substituted or unsubstituted heteroaryl, substituted or unsubstituted alkylaryl, or substituted or unsubstituted arylalkyl. The integer k ranges from 1–8 and preferably from 2–4. The anion X$^-$ is a halide or an anion derived from a mineral or organic acid. Q is (CH$_2$)$_w$, (CH$_2$)$_x$O(CH$_2$)$_z$, (CH$_2$)$_x$NR(CH$_2$)$_z$, or (CH$_2$)$_x$S(CH$_2$)$_z$, where w is an integer from 2 to 6 and x and z are integers from 1 to 6.

The organic group can be an aromatic group of the formula A$_y$Ar—, which corresponds to a primary amine of the formula A$_y$ArNH$_2$. In this formula, the variables have the following meanings: Ar is an aromatic radical such as an aryl or heteroaryl group. Preferably, Ar is selected from the group consisting of phenyl, naphthyl, anthracenyl, phenanthrenyl, biphenyl, pyridinyl, benzothiadiazolyl, and benzothiazolyl; A is a substituent on the aromatic radical independently selected from a preferred functional group described above or A is a linear, branched or cyclic hydrocarbon radical (preferably containing 1 to 20 carbon atoms), unsubstituted or substituted with one or more of those functional groups;

and y is an integer from 1 to the total number of —CH radicals in the aromatic radical. For instance, y is an integer from 1 to 5 when Ar is phenyl, 1 to 7 when Ar is naphthyl, 1 to 9 when Ar is anthracenyl, phenanthrenyl, or biphenyl, or 1 to 4 when Ar is pyridinyl. In the above formula, specific examples of R and R' are $NH_2$—$C_6H_4$—, $CH_2CH_2$—$C_6H_4$—$NH_2$, $CH_2$—$C_6H_4$—$NH_2$, and $C_6H_5$.

Another set of organic groups which may be attached to the carbon product are organic groups substituted with an ionic or an ionizable group as a functional group. An ionizable group is one which is capable of forming an ionic group in the medium of use. The ionic group may be an anionic group or a cationic group and the ionizable group may form an anion or a cation.

Ionizable functional groups forming anions include, for example, acidic groups or salts of acidic groups. The organic groups, therefore, include groups derived from organic acids. When the organic group contains an ionizable group forming an anion, such an organic group can have a) an aromatic group and b) at least one acidic group having a pKa of less than 11, or at least one salt of an acidic group having a pKa of less than 11, or a mixture of at least one acidic group having a pKa of less than 11 and at least one salt of an acidic group having a pKa of less than 11. The pKa of the acidic group refers to the pKa of the organic group as a whole, not just the acidic substituent. More preferably, the pKa is less than 10 and most preferably less than 9. The aromatic group of the organic group can be directly attached to the carbon product. The aromatic group may be further substituted or unsubstituted, for example, with alkyl groups. The organic group can be a phenyl or a naphthyl group and the acidic group is a sulfonic acid group, a sulfinic acid group, a phosphonic acid group, or a carboxylic acid group. Examples of these acidic groups and their salts are discussed above. The organic group can be a substituted or unsubstituted sulfophenyl group or a salt thereof; a substituted or unsubstituted (polysulfo)phenyl group or a salt thereof, a substituted or unsubstituted sulfonaphthyl group or a salt thereof; or a substituted or unsubstituted (polysulfo) naphthyl group or a salt thereof. An example of a substituted sulfophenyl group is hydroxysulfophenyl group or a salt thereof.

Specific organic groups having an ionizable functional group forming an anion (and their corresponding primary amines) are p-sulfophenyl (p-sulfanilic acid), 4-hydroxy-3-sulfophenyl (2-hydroxy-5-amino-benzenesulfonic acid), and 2-aminoethanesulfonic acid). Other organic groups having ionizable functional groups forming anions can also be used.

Amines represent examples of ionizable functional groups that form cationic groups. For example, amines may be protonated to form ammonium groups in acidic media. An organic group having an amine substituent can have a pKb of less than 5. Quaternary ammonium groups (—$NR_3^+$) and quaternary phosphonium groups (—$PR_3^+$) also represent examples of cationic groups. The organic group can contain an aromatic group such as a phenyl or a naphthyl group and a quaternary ammonium or a quaternary phosphonium group. The aromatic group can be directly attached to the carbon product. Quaternized cyclic amines, and even quaternized aromatic amines, can also be used as the organic group. Thus, N-substituted pyridinium compounds, such as N-methyl-pyridyl, can be used in this regard. Examples of organic groups include, but are not limited to, $(C_5H_4N)C_2H_5^+$, $C_6H_4(NC_5H_5)^+$, $C_6H_4COCH_2N(CH_3)_3^+$, $C_6H_4COCH_2(NC_5H_5)^+$, $(C_5H_4N)CH_3^+$, and $C_6H_4CH_2N(CH_3)_3^+$.

An advantage of the modified carbon products having an attached organic group substituted with an ionic or an ionizable group is that the modified carbon product may have increased water dispersibility relative to the corresponding untreated carbon product. Water dispersibility of a modified carbon product increases with the number of organic groups attached to the carbon black having an ionizable group or the number of ionizable groups attached to a given organic group. Thus, increasing the number of ionizable groups associated with the modified carbon product should increase its water dispersibility and permits control of the water dispersibility to a desired level. It can be noted that the water dispersibility of a modified carbon product containing an amine as the organic group attached to the carbon product may be increased by acidifying the aqueous medium.

Because the water dispersibility of the modified carbon products depends to some extent on charge stabilization, the ionic strength of the aqueous medium can be less than 0.1 molar. The ionic strength can also be less than 0.01 molar.

When such a water dispersible modified carbon product is prepared, the ionic, ionizable, or polar group can be ionized in the reaction medium. The resulting product solution or slurry may be used as is or diluted prior to use. Alternatively, the modified carbon product may be dried by techniques used for conventional carbon blacks. These techniques include, but are not limited to, drying in ovens and rotary kilns. Overdrying, however, may cause a loss in the degree of water dispersibility.

In addition to their water dispersibility, modified carbon products having an organic group substituted with an ionic or an ionizable group may also be dispersible in polar organic solvents such as dimethylsulfoxide (DMSO), and formamide. In alcohols such as methanol or ethanol, use of complexing agents such as crown ethers increases the dispersibility of carbon black products, having an organic group containing a metal salt of an acidic group.

Aromatic sulfides encompass another group of organic groups. Modified carbon products having aromatic sulfide groups are particularly useful in rubber compositions. These aromatic sulfides can be represented by the formulas $Ar(CH_2)_qS_k(CH_2)_rAr'$ or $A$—$(CH_2)_qS_k(CH_2)_rAr''$ wherein Ar and Ar' are independently substituted or unsubstituted arylene or heteroarylene groups, Ar" is an aryl or heteroaryl group, k is 1 to 8 and q and r are 0–4. Substituted aryl groups would include substituted alkylaryl groups. Arylene groups can include phenylene groups, particularly p-phenylene groups, or benzothiazolylene groups. Aryl groups can include phenyl, naphthyl and benzothiazolyl. The number of sulfurs present, defined by k preferably ranges from 2 to 4. Modified carbon products can have an attached aromatic sulfide organic group of the formula —$(C_6H_4)$—$S_k$—$(C_6H_4)$—, where k is an integer from 1 to 8, and more preferably where k ranges from 2 to 4. Aromatic sulfide groups can be bis-para—$(C_6H_4)$—$S_2$—$(C_6H_4)$— and para—$(C_6H_4)$—$S_2$—$(C_6H_5)$. The diazonium salts of these aromatic sulfide groups may be conveniently prepared from their corresponding primary amines, $H_2N$—Ar—$S_k$—Ar'—$NH_2$ or $H_2N$—Ar—$S_k$—Ar". Groups include dithiodi-4,1-phenylene, tetrathiodi-4,1-phenylene, phenyldithiophenylene, dithiodi-4,1-(3-chlorophenylene), -(4-$C_6H_4$)—S—S-(2-$C_7H_4NS$), -(4-$C_6H_4$)—S—S-(4-$C_6H_4$)-OH, -6-(2-$C_7H_3NS$)—SH, -(4-$C_6H_4$)—$CH_2CH_2$—S—S—$CH_2CH_2$-(4-$C_6H_4$)—, -(4-$C_6H_4$)—$CH_2CH_2$—S—S—$CH_2CH_2$-(4-$C_6H_4$)—, -(2-$C_6H_4$)—S—S-(2$C_6H_4$)—, -(3$C_6H_4$)—S—S-(3-$C_6H_4$)—, -6-($C_6H_3N_2S$), -6-(2-$C_7H_3NS$)—S—NRR' where RR' is —CH$_2$CH$_2$OCH$_2$CH$_2$-, -(4-C$_6$H$_4$)—CH=CH$_2$, -(4-C$_6$H$_4$)—S—SO$_3$H, -(4-C$_6$H$_4$)—SO$_2$NH-(4-C$_6$H$_4$)—S—S-(4-C$_6$H$_4$)—NHSO$_2$-(4-C$_6$H$_4$)—, -6-(2-C$_7$H$_3$NS)—S—S-2-(6-C$_7$H$_3$NS)—, -(4-C$_6$H$_4$)—S—CH$_2$-(4-C$_6$H$_4$)—, -(4-C$_6$H$_4$)—SO$_2$—S-(4-C$_6$H$_4$)—, -(4-C$_6$H$_4$)—CH$_2$—S—CH$_2$-(4-C$_6$H$_4$)—, -(3-C$_6$H$_4$)—CH$_2$—S—CH$_2$-(3-C$_6$H$_4$)—, -(4C$_6$H$_4$)—CH$_2$—S—S—CH$_2$-(4-C$_6$H$_4$)—, -(3-C$_6$H$_4$)—CH$_2$—S—S—CH$_2$-(3-C$_6$H$_4$)—, -(4-C$_6$H$_4$)—S—NRR' where RR' is —CH$_2$CH$_2$OCH$_2$—, -(4-C$_6$H$_4$)—SO$_2$NH—CH$_2$CH$_2$—S—S—CH$_2$CH$_2$—NHSO$_2$-(4-C$_6$H$_4$)—, -(4-C$_6$H$_4$)-2-(1,3-dithianyl;), and -(4-C$_6$H$_4$)—S-(1,4-piperizinediyl)-S-(4-C$_6$H$_4$)—.

Another set of organic groups which may be attached to the carbon product are organic groups having an aminophenyl, such as (C$_6$H$_4$)—NH$_2$, (C$_6$H$_4$)—CH$_2$—(C$_6$H$_4$)—NH$_2$, (C$_6$H$_4$)—SO$_2$—(C$_6$H$_4$)—NH$_2$. Organic groups also include aromatic sulfides, represented by the formulas Ar—S$_n$—Ar' or Ar—S$_n$—Ar", wherein Ar and Ar' are independently arylene groups, Ar" is an aryl and n is 1 to 8. Methods for attaching such organic groups to carbon products are discussed in U.S. patent application Ser. Nos. 08/356,660, 08/572,525, and 08/356,459, the disclosures of which are fully incorporated by reference herein.

Preferably, the organic group comprises an aromatic group and/or a C$_1$–C$_{100}$ alkyl group (and more preferably a C$_1$–C$_{12}$ alkyl group) directly attached to the carbon product, with or without an ionic, ionizable, or polar group to improve dispersion in aqueous media. For dispersion, in organic solvents such as toluene, the attached group would be non-polar or non-ionic.

Additional examples of organic groups are described in U.S. Pat. Nos. 5,803,959; 5,851,280; 5,571,311; 5,554,739; 5,575,845; 5,630,868; 5,672,198, 5,698,016: 5,707,432; and 5,713,988; and PCT Publication Nos. WO 97/47692; WO 97/47699 and WO 96/18688, and U.S. patent application Ser. No. 08/990,715 filed Dec. 19, 1997, all incorporated herein in their entireties by reference herein.

More than one type of organic group can be attached to the carbon product, or two or more modified carbon products with different attached organic groups can be used. Using two or more different types of organic groups permits a combination of properties. If two different types of organic groups are attached, for example, a sulfanilic group and a styrenic group, the sulfanilic group promotes dispersibility and the styrenic group serves as a radical grafting site. The ratio of the different organic groups can be the same or different. Preferably, only the minimum treatment level of the ionic, ionizable, or polar group is used to impart stability to the dispersion. For example, groups such as ionic species (e.g., sulphates, phosphates, alkali salts of organic acids or quaternary ammonium salts), non-ionic species (e.g., hydroxyl, organic acids) or surfactant stabilizers (e.g., SDMS, SDS, Antarox) can be used to provide stable carbon product dispersions in aqueous media. Dispersion of the modified carbon products in organic liquids can be facilitated in a similar manner but employing treatments which are more compatible with these less polar environments. Treatment levels of the organic group for purposes of radical grafting sites would depend on material uses. For instance, attachment of epoxy groups would facilitate grafting to hydroxyl bearing polymer matrices such as polyurethanes or polycarbonates or amine matrices such as nylon. Other examples include the attachment of radical sensitive vinyl groups such as styrenics or acrylates, to facilitate crosslinking type reactions in radical polymerizations. These attached groups would ultimately affect the properties of the materials containing these modified carbon products. The properties that would be affected include, but are not limited to, impact behaviour, modulus response, and dispersibility in plastics.

Also, a combination of different modified carbon products can be used. For instance, a modified carbon product having one type of organic group attached thereto can be used in combination with another modified carbon product having a different organic group attached thereto. Also, a modified carbon product such as an aggregate comprising a carbon phase and a silicon-containing species phase can be used in combination with a modified carbon product having an attached organic group, and so on.

The modified carbon product which is coated with one or more polymers can have any particle size and/or surface area so long as the particle is capable of being at least partially coated with one or more polymers. Preferably, the primary particle size of the modified carbon product is from about 5 nm to about 100 nm and more preferably from about 8 nm to about 75 nm. The nitrogen surface area as measured by the BET method, of the modified carbon product is preferably from about 20 m$^2$/g to about 1500 m$^2$/g and more preferably from about 25 m$^2$/g to about 700 m$^2$/g and most preferably from about 30 m$^2$/g to about 250 m$^2$/g. If the modified carbon product is not a particle, such as a fiber, preferably the modified carbon product has the following preferred properties: reinforcement or conduction properties or other physical properties associated with filler particles.

Figure 4:
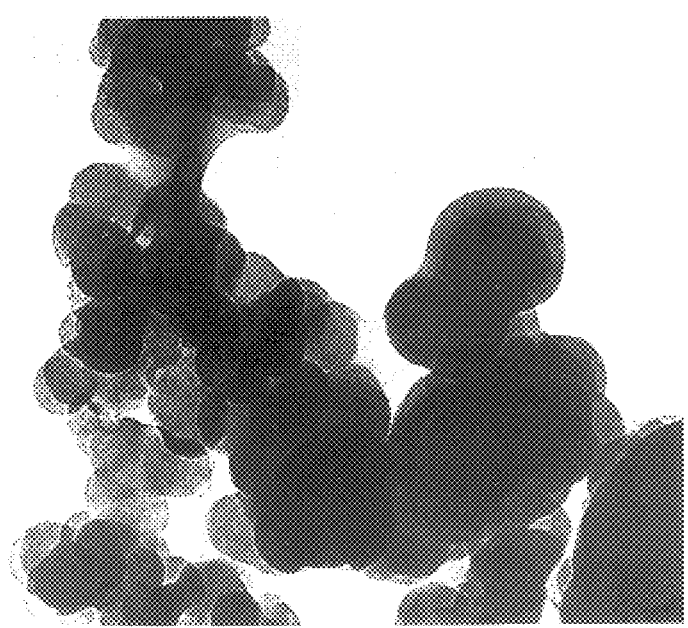

The thickness of the coating on the modified carbon product can be uniformed or can vary in thickness. The thickness of the coating can be about 1 nm or more. Preferably, the polymer coated onto the modified carbon product is substantially uniform in thickness. Preferably, the thickness of the polymer coating on the modified carbon product is from about 10 nm to about 100 nm, more preferably from about 20 nm to about 75 nm, and most preferably from about 30 nm to about 50 nm. FIGS. 3 and 4 are microphotographs showing the coating around the carbon black.

The modified carbon product can have more than one coating or shell. In other words, the modified carbon product can have multiple layers of shells or coatings which partially or fully encapsulate the modified carbon product or a previous coating or shell. The polymers comprising the various layers can be the same or different. For instance, one layer can be cross-linked while the next layer can be not cross-linked. Each of the various coatings, if more than one is present on the modified carbon product, can be substantially the same or vary in thickness if desired.

The polymer which is coated onto the modified carbon product can be a homo-polymer, copolymer, terpolymer, and/or a polymer containing any number of different repeating units.

The polymer can be any type of polymer, such as a random polymer, alternating polymer, graft polymer, block polymer, star-like polymer, and/or comb-like polymer. The polymer can also be one or more polyblends. The polymer can be an interpenetrating polymer network (UPN); simultaneous interpenetrating polymer network (SIN); or interpenetrating elastomeric network (IEN). The polymer can be thermoplastic or thermosettable.

Specific examples of polymers include, but are not limited to, linear and non-linear polymers such as polyethylene, poly(vinylchloride), polyisobutylene, polystyrene, polycaprolactam (nylon), polyisoprene, and the like. Other general classes of polymers include polyamides, polycarbonates, polyelectrolytes, polyesters, polyethers, (polyhydroxy)

benzenes, polyimides, polymers containing sulfur (such as polysulfides, (polyphenylene) sulfide, and polysulfones, polyolefins, polymethylbenzenes, polystyrene and styrene copolymers (ABS included), acetal polymers, acrylic polymers, acrylonitrile polymers and copolymers, polyolefins containing halogen (such as polyvinyl chloride and polyvinylidene chloride), fluoropolymers, ionomeric polymers, polymers containing ketone group(s), liquid crystal polymers, polyamide-imides, polymers containing olefinic double bond(s) (such as polybutadiene, polydicyclopentadiene), polyolefin copolymers, polyphenylene oxides, polyurethanes, thermoplastic elastomers, silicone polymers, alkyd, epoxy, unsaturated polyester, vinyl ester, urea-, melamine-, or phenol-formaldehyde resins, and the like. Preferably, the polymer is an acrylic polymer, a methacrylic polymer, or a styrenic polymer, but would largely depend upon the intended application. For instance, reinforcement applications would generally involve the formation of a rubber product that could be attached to the modified carbon product in a manner such that the rubber product is preferably not extractable, e.g., not extractable in solvents. This can be accomplished by using a modified carbon product that has styrenic groups attached to the surface. During an aqueous media radical polymerization, the propagating chains could graft to these sites on the surface of the modified carbon product and generate a rubbery coated particle.

The polymer coated modified carbon products can be made by a number of ways. Preferably, the modified carbon products are made by, but are not limited to, aqueous mediated polymerization environments such as emulsion polymerization or suspension polymerization processes as well as solvent based polymerizations. The polymerization involved are generally chain growth polymerizations and/or step growth polymerizations. Examples of the aqueous based polymerization processes are described below.

With respect to an emulsion polymerization process, in general, an initiator, at least one monomer, and a modified carbon product as described above, are combined or added into an aqueous-based medium. The components can be added in any order but it is preferred that the modified carbon product be added to the aqueous-based medium first and then the initiator and then the monomer. Then, an emulsion polymerization is conducted to form a polymer coated modified carbon product.

Afterwards, further amounts of an initiator can optionally be added to ensure continuing and/or complete polymerization of the monomer(s).

The monomer(s) used in this polymerization is capable of being polymerized by any type of free radical polymerization including highly specialized free radical polymerizations such as stable free radical polymerization (SFRP) and atom transfer radical polymerization (ATRP). Examples of such olefinic type monomers include, but are not limited to, acrylates, methacrylates, styrenics, dienes, or vinyl esters as well as monomers such as maleic anhydride or vinyl sulfone, vinyl pyridine, or vinylpyrolidinone. Preferably, the monomer is styrenic, acrylic, or methacrylic or mixtures or combinations thereof.

Derivatives of these various monomers can also be used as well as mixtures of two or more monomers.

Generally, the amount of monomer present is an amount sufficient to at least polymerize and partially coat the modified carbon products in the aqueous-based or solvent based medium. Generally, this amount of monomer is from about 20% to about 80% by volume, more preferably from about 25% to about 60% by volume, and most preferably from about 30% to about 50% by volume, based on the total volume.

The aqueous-based medium used can be any aqueous-based medium capable of permitting a free radical polymerization to occur. Preferably, the aqueous-based medium is water or water-based, and more preferably is deionized water.

The amount of the aqueous-based medium is an amount sufficient to permit at least free radical polymerization to occur such that at least a portion of the modified carbon product is partially coated with the polymerized monomer.

With respect to the initiator, any initiator capable of initiating a radical polymerization of at least a portion of the monomers present can be used. Examples include, but are not limited to, peroxides such as hydrogen peroxide, and ammonium peroxysulfate. Other examples include azo compounds, for example, azobisisobutylnitrile, redox initiators such as ferrous ions (e.g. $FeCl_2$), silver alkyl reagents, and other methods of initiation such as photo induced or electrolytic transfer process. Specific examples include, but are not limited to, ammonium peroxydisulfate, potassium peroxydisulfate, sodium peroxydisulfate, hydrogen peroxide, tertiary-butyl hydroperoxide, cumyl hydroperoxide, or their combinations with reducing agents such as sodium bisulfite, sodium formaldehyde sulfoxylate, and ferrous salts.

Generally, the initiator is present in an amount to at least partially if not completely initiate to polymerization of the monomers present in the aqueous-based medium such as to at least partially coat the modified carbon product with the polymerized monomer(s). Typical ingredients and levels will be apparent to one skilled in the art of emulsion polymerization.

The modified carbon product, in order to be substantially encapsulated or coated with the polymer during the emulsion polymerization, should be adequately dispersed in the aqueous-based medium. The modified carbon product can be dispersed by mechanical means such as by stirring in order to keep the modified carbon product substantially suspended in the aqueous-based medium and/or one or more surfactants can be added to the aqueous-based medium in order to stabilize the suspension. In addition, a dispersion aid can be applied onto the modified carbon products prior to their introduction into the aqueous-based medium in order to provide a better dispersion in the aqueous-based medium. When the modified carbon product used has an attached organic group which is substituted with an ionic, ionizable, or polar group, generally, no surfactant or dispersion aid is used, or at the very least, a lower amount of surfactant and/or dispersion aid can be used. This is because the modified carbon product having an organic group with a substituted ionic, ionizable, or polar group is sufficiently water dispersible and thus no surfactant or dispersion aid is needed. Thus, this makes for an economical system for aqueous mediated polymerizations as well as provides uniform coverage, if desired, on the modified carbon products. In addition, with the use of the water dispersible modified carbon products, no stirring would be necessary either.

If a modified carbon product is used which is not as water dispersible as a modified carbon product having an organic group with an ionic, ionizable, or polar group, then a surfactant can be used to further stabilize the emulsion. Examples of surfactants which can be used include, but are not limited to, ethoxylated alcohols such as polyethylene glycol, SDS, SDMS, and/or antarox surfactants. The surfactant, if used, can be present in amounts ranging from about 0.01 to about 30, more preferably from about 0.1 to about 10, and most preferably from about 1 to about 5, based on the weight of the modified carbon product.

Conventional ingredients typically used with free radical polymerization reactions can also be present such as surface active agents (for aqueous media preparations such as suspension or emulsion techniques) and inhibiting or quenching agents (e.g., quinones or hydroquinones), crosslinking agents such as divinylbenzene, as well as chain-transfer agents such as mercaptans, $CBr_4$ or other modifiers typically employed in free radical polymerizations and known to those skilled in the art of polymer synthesis and modification. The amounts of these various optional ingredients can vary depending upon the initiator, monomer, and modified carbon product used.

The emulsion polymerization, for example and in more detail, is preferably conducted where the aqueous-based medium, e.g., water, and the modified carbon black are charged into a flask kept in a water bath at approximately 70° C. The flask is purged with nitrogen and then an initiator is added to the flask. The monomers are then introduced at a fixed rate into the reacting flask using a peristaltic pump, such as a Watson-Marlow peristaltic pump, or other suitable introduction means such as gravametric devices, e.g., either flow controlled or manually adjusted. The reactions are allowed to proceed until completion such as for 10 hours, before the flask is cooled to room temperature. Optionally, before cooling, additional amounts of initiator can be added while stirring the flask at about 70° C. to ensure complete polymerization of the monomer.

The polymer coated modified carbon products can then be separated from the aqueous-based medium and any unreacted monomers or by-products by any means such as filtering or evaporation, or by other direct drying methods such as freeze drying and spray drying. Alternatively, the material can be allowed to settle once it is of sufficient coating weight and the aqueous supernatant can be decanted off. The residual wet solid can be dried using conventional techniques such as oven batch drying or continuous drying such as that achieved in fluidized bed dryers.

Preferably, the monomer(s) can be added at any rate, but preferably at rates such that the monomer(s) is completely added over a period from about 15 minutes to about 24 hours, more preferably from about 1 hour to about 10 hours, and most preferably from about 2 hours to about 5 hours in order to obtain an optimized coating on the modified carbon product.

The conditions for conducting the polymerizations described above can be optimized by a number of factors such as temperature, agitation, atmosphere in which the polymerization occurs, pressure, and the like. These factors and their effects would be the same or similar to the knowledge possessed by those skilled in the art with respect to general polymerizations and would be easily determinable in view of this knowledge coupled with the details provided herein. Preferably, as shown in the examples, the atmosphere is inert and the temperatures during polymerization are somewhat dependent on the initiator system used. General polymerization factors and parameters, that can be applied to the present invention in view of the disclosure herein, are set forth in "The Chemistry of Free Radical Polymerization," G. Moad and D. Solomon, Pergamon Press, 1995, and "Principles of Polymerization," $2^{nd}$ Ed., G. Odian, Wiley-Interscience Pibl., 1981, both incorporated in their entirety by reference herein.

Polymer coated modified carbon products can also be formed by solvent based polymerization processes which are similar to the aqueous based polymerization procedures. Modified carbon products bearing groups that enhance dispersion in solvents, such as toluene, and/or allow for the grafting of the propagating polymer to the carbon products are preferred. Other examples of solvents include but are not limited to solvents having a low chain transfer constant, such as toluene, xylenes, THF, and ethyl acetate.

Examples of solvent-based polymerizations include, but are not limited to, solution polymerization and solution coating. With respect to solution coating, generally, once the polymerization is complete, the modified carbon product is added by any means and preferably is dispersed in the polymer solution for a time sufficient to at least partially coat the modified carbon product with the polymer present in solution. Then, controlled separation of the solvent from the polymer and polymer coated modified carbon product occurs such as by controlled evaporation or precipitation into a non-solvent. The polymer coated modified carbon product is then subjected to drying for instance at 40° C. under vacuum.

Thus, one type of solution coating process involves the preparation of a polymer in solution (e.g., a solvent), wherein the modified carbon product is then added to the polymer solution and the solvent containing the polymer is then removed, such as by evaporation or other means. The solvent used in the coating process is generally an organic solvent such as toluene but can include polar solvents such as methanol depending upon the nature of the polymer material intended to cover the modified carbon product.

In solution polymerization, the polymerization of the monomer(s) occurs in situ in the presence of the modified carbon product in an organic solvent. Other conventional ingredients typically used in such solvent-based polymerizations can also be present in conventional amounts. However, in free-radical polymerization, preferably the initiator is present in amounts higher than conventional.

In these types of polymerization processes, the solvent based solution contains free radical initiators as described above, and the desired monomer(s). In the case of a thermally induced initiation, the reaction solutions is heated, e.g., to approximately 70° C. for several hours. This type of polymerization is generally allowed to proceed until completion such as for 30 hours at 60° C. under a nitrogen atmosphere. The final product would be collected using conventional recovery techniques, such as evaporative techniques.

The polymer coated modified carbon products of the present invention can also be prepared through a bulk polymerization. In this process, a polymerizable monomer is present along with the modified carbon products and an initiator. Generally, in this process, a controlled amount of initiator is present in order to have unreacted monomer remaining at all times in order to act as the solvent. First, in this type of process, no formal solvent needs to be present since the unreacted monomer acts as the solvent. The various types of monomers that can be used in this process include, but are not limited to, the monomers described earlier.

Also, the polymer coated modified carbon products of the present invention can be made by dispersing the modified carbon products in a latex formulation which, due to the dispersibility of the carbon products, will be coated and then can be separated by separating means known to those skilled in the art such as evaporation, freeze drying, spray drying, coagulation, centrifugation, filtration, and the like.

The polymer coated modified carbon products of the present invention can be used in a number of ways. In particular, the polymeric coated modified carbon products can be used in masterbatches which contain from low to high concentrations of carbon products, such as carbon black. The polymeric coated modified carbon products can be introduced into a masterbatch in the same manner as conventional carbon black is formed into a polymeric masterbatch. Alternatively, the polymeric coated modified carbon products can themselves act as a highly concentrated or standard masterbatches in view of the amount of polymer already present and coated onto the modified carbon products.

With respect to using the polymer coated modified carbon products of the present invention as a component of masterbatches, the polymer coated modified carbon product is formed into a masterbatch just as conventional masterbatches are formed. Accordingly, the polymer coated modified carbon product can be added with standard masterbatch ingredients which may include waxes and polymers as well as other optional ingredients. When the polymer coated modified carbon products of the present invention are used to form masterbatches, generally, the amount of modified carbon product present can be amounts traditionally used with conventional carbon products, such as carbon black, in masterbatches. However, with the polymer coated modified carbon products of the present invention, masterbatches with higher loadings of carbon products are possible and thus masterbatches of the present invention can contain from about 10 wt % to about 95 wt % or more carbon product, and more preferably from about 50 wt % to about 90 wt % carbon product, based on the weight of the masterbatch.

The modified carbon products of the present invention can be incorporated or dispersed in the polymer to form the polymeric product using any means which permit the introduction of conventional reinforcement agents, fillers, or colorants like carbon black. Examples include hopper feeding of the modified carbon product into an extruder such as a single screw or multi-screw extruder, or an injection molder. Other means of introducing the modified carbon product into the polymer include mixers, like internal mixers, such as Banbury and Brabender mixers. Other means of introducing, and preferably dispersing the modified carbon product in the polymer include, but are not limited to, long continuous mixers, continuous compounding extruders (e.g., Buss Kneader), tumble blenders, pelletizers, and the like.

Since the polymer coated modified carbon products are capable of being well dispersed prior to coating each individual primary aggregate is preferably evenly coated. This allows for good surface wetting characteristics of the polymer coated modified carbon product in the matrix material it is diluted with. This effect results in superior dispersion characteristics when compared to the identical procedure carried out with untreated or conventional carbon products or with comparable commercial masterbatches. Moreover, the ease at which these materials are prepared in view of the process for preparing masterbatches, makes the polymer coated modified carbon products superior additives. Additionally, since the modified carbon particles are located within discrete polymer coatings, and when the formulation of the coating resin is properly designed, unique properties can be attained which are not necessarily attained with a direct mixture of the polymer and the carbon particles. For instance, properties such as reinforcement of rigid matrices can be attained when compared to materials having separate carbon particles and polymer compounded into them separately.

The polymer coated modified carbon products of the present invention have the ability to chemically interact with the polymer coating and this coating, when adequately formulated can also interact with the matrix polymer product in which it is introduced to. The interaction between modified carbon product and polymer coating has been described above. In the case of the coating resin interacting with the matrix polymer, the coated modified carbon products can attach to the polymer matrix, e.g., graft onto the polymer matrix of the polymeric product. This ability can lead to improved properties such as impact strength and tensile strength. Other properties such as melt flow viscosities can be influenced in this way. Advantages of this method include but are not strictly limited to, the ability to produce materials of superior impact strength, controlled flow properties, beneficial material surface adhesion, and improved color characteristics. Another advantage of the present invention is improved UV stabilization of the polymeric products containing the polymer coated modified carbon products of the present invention. FIGS. 1 and 2 show the ability of a polymer coated modified carbon product to provide improved properties with respect to tensile and impact strength once the polymer coated modified carbon products are incorporated into a polymer matrix, like SAN. In these graphs, the "Sterling" is conventional carbon black and the "coated Sterling" is modified carbon black having attached-styrene groups and subsequently coated with about 20 nm of PS/BA/GMA polymer.

The polymeric products of the present invention, like any conventional polymer, can be formed and shaped into any desired article or shape.

Further, the polymeric products of the present invention include solvent-borne and solvent-free polymeric coatings as well as polymeric foams. With respect to polymeric coatings, typically an aqueous or non-aqueous medium will be present in amounts typically found with respect to conventional polymeric coatings. With respect to polymeric foams, typically a foaming agent will be present in amounts conventionally found with respect to conventional polymeric foams.

The polymeric products of the present invention can include additional conventional ingredients typically found in polymers such as anti-oxidants, stabilizers (e.g., light/UV and thermal types), plasticizers, fillers, impact modifiers, lubricants, biocides, flame retardants, process modifiers, antistatic agents, blowing (foaming) agents, colorants, antimicrobials, antiblocking agents, organic peroxides, optical brighteners, coupling agents, compatibilizers, process acids, mold release aids, tack additives, viscosity suppressants, reactive additives fibers, antifogging agents, antihazing agents, bacteriocides, conductivity agents, cross-linking agents, delustering agents, dispersants, flexibilizers, flow control agents, fluorescent agents, fusion promoters, mildewcides and fungicides, nucleating agents, organic chelating agents, surface treatments, and the like, or other materials as described in Plastic Additives and Modifiers Handbook, Jesse Edenhaum, Ed., pp. 193–1086 (1992), incorporated herein by reference.

The polymer coated modified carbon products preferably have improved properties compared to untreated carbon black and/or the polymers themselves which are coated onto the carbon product when added to a polymeric product. For instance, polymeric products containing the polymer coated modified carbon products of the present invention preferably have improved impact properties and/or tensile properties compared to polymeric products containing untreated carbon black.

In more detail, the polymer coated modified carbon products are capable of improving ultimate impact strength of resins such as SAN (styrene acrylonitrile) when compared to SAN containing unmodified carbon black and rubber reinforcing agents. Other advantages include the ability to act as easily (low shear) dispersible colorants or reinforcing agents when compared to conventional masterbatches with controlled viscosity and better colour characteristic. Alternatively, if the resultant weight percentage of modified carbon product in a resin produced in situ is in the range of 0.01% wt to 3.0% wt., the resin can be considered a direct letdown material with excellent dispersion characteristics without the use of shear intensive mixing.

Besides modified carbon products, modified pigments other than carbon products can be used as well to form polymer coated modified pigments. For purposes of the present invention, modified pigments would encompass all types of pigments capable of having at least one organic group attached thereto. The details of the formation and applications of the polymer coated modified carbon product described earlier applied equally here to the modified pigments as well. The colored pigment is any pigment which can be modified with the attachment of an organic group, like an aromatic group or an alkyl group. The colored pigments other than carbon products include, but are not limited to, black, blue, white, cyan, green, violet, magenta, red, yellow, tones and/or shades thereof as well as mixtures thereof. Suitable classes of colored pigments include, but are not limited to, anthraquinones, phthalocyanine blues, phthalocyanine greens, diazos, monoazos, pyranthrones, perylenes, heterocyclie yellows, quinacridones, and (thio) indigoids. Specific examples and further information concerning the colored pigments and methods of making colored pigments with attached organic groups are described in U.S. Pat. No. 5,837,045 and PCT Publication No. WO 97/47699, both incorporated in their entireties by reference herein.

The present invention will be further clarified by the following examples, which are intended to be purely exemplary of the present invention.

EXAMPLES

In each of the Examples, S represents Sterling® carbon black; R represents Regal® carbon blacks; "nf" represents no organic group attached; the first number represents the thickness (in nm) of the polymer coating on the carbon product and the second number represents the amount of carbon black and any polymer coated onto the carbon black as a percent by total weight of the polymer matrix with filler. For instance, R-nf-0-50 would mean Regal® carbon black which was untreated (no organic groups attached) and 0 is the polymer coating thickness (i.e., no coating) and 50 is the amount of carbon product and any coating by total weight percent of the polymer matrix with filler.

Example 1

Homopolymers of styrene (PS), acrylonitrile (PAN) and glycidyl methacrylate (PGMA), and a terpolymer of the three of them (PS/AN/GMA) were prepared by solution polymerisation in toluene at a solvent to monomer ratio of 70:30 by weight. AZBN was used as the initiator at a level of 0.1% by weight of monomer. The polymerisation was allowed to proceed for 16 hours at 60° C. under a nitrogen atmosphere. The resulting polymers were separated and purified by precipitation into a large excess of petroleum ether (60/80) and dried at 40° C. under vacuum to constant weight. The comonomer compositions used are given in Table 1.

TABLE 1

The compositions of the styrene, acrylonitryle and glycidyl methacrylate used in individual polymerization's.

| Abbreviation | Compound | $^{wt}S\ \%^{(a)}$ | $^{wt}AN\ \%^{(b)}$ | $^{wt}GMA\ \%^{(c)}$ |
|---|---|---|---|---|
| PS | Polystyrene | 100 | 0 | 0 |
| PAN | Polyacrylonitile | 0 | 100 | 0 |
| PGMA | Polyglycidyl methacrylate | 0 | 0 | 100 |
| PS/AN/GMA | Terpolymer | 72 | 23 | 5 |

(a) $^{wt}S\ \%$ is the percentage weight of styrene in the total monomer mixture
(b) $^{wt}AN\ \%$ is the percentage weight of acrylonitrile in the total monomer mixture
(c) $^{wt}GMA\ \%$ is the percentage weight of glycidyl methacrylate in the total monomer mixture The structure of the terpolymer prepared had the following structure:

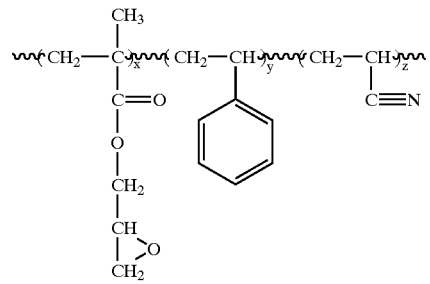

Coating of the carbon black or the modified carbon black particles was achieved via a solution evaporation method. There were three main steps in the procedure for coating the particles: first, the dissolution of the terpolymer (PS/AN/GMA) in a suitable solvent (100:5 wt % solvent: wt % terpolymer); next, the dispersion of the washed particles into the solution: and finally, the controlled evaporation of the solvent. The dispersion of the particles into the toluene-dissolved copolymer was carried out using a Silverson L4R high-shear mixer. The solvent was removed from the mixture under water pump vacuum using a rotary-film evaporator at 70° C. Three different samples were prepared from each carbon black grade or modified carbon black. In all cases, a free-flowing powder was obtained. Table 2A shows the mass of terpolymer used to prepare the coated samples relative to 1 g of carbon black or modified carbon black.

TABLE 2A

Coated samples indicating the mass of terpolymer used in their preparation with respect to 1 g of carbon black.

| Sample Number | Carbon Black$^{(a)}$ | Attached Group | Mass of Terpolymer/g | $w_{tp}^{(b)}$ |
|---|---|---|---|---|
| 1A | REGAL 80-N ® | None | 0.21 | 0.174 |
| 1B | REGAL 80-N ® | None | 0.41 | 0.291 |
| 1C | REGAL 80-N ® | None | 0.63 | 0.387 |
| 2A | REGAL 80-A ® | —$C_6H_4NH_2$ | 0.20 | 0.167 |
| 2B | REGAL 80-A ® | —$C_6H_4NH_2$ | 0.41 | 0.291 |
| 2C | REGAL 80-A ® | —$C_6H_4NH_2$ | 0.61 | 0.379 |
| 3A | STERLING 4620-N ® | None | 0.29 | 0.225 |
| 3B | STERLING 4620-N ® | None | 0.61 | 0.379 |
| 3C | STERLING 4620-N ® | None | 0.86 | 0.462 |
| 4A | STERLING 4620-A ® | —$C_6H_4NH_2$ | 0.29 | 0.225 |

TABLE 2A-continued

Coated samples indicating the mass of terpolymer used in their preparation with respect to 1 g of carbon black.

| Sample Number | Carbon Black[a] | Attached Group | Mass of Terpolymer/g | $w_{tp}$[b] |
|---|---|---|---|---|
| 4B | STERLING 4620-A ® | —$C_6H_4NH_2$ | 0.56 | 0.359 |
| 4C | STERLING 4620-A ® | —$C_6H_4NH_2$ | 0.81 | 0.448 |

[a]all commercially available grades of carbon black from Cabot Corporation
[b]$w_{tp}$ is the mass fraction of terpolymer to carbon black;

$$w_{tp} = \frac{\text{mass of terpolymer}}{\text{mass of terpolymer} + \text{mass of carbon black}}$$

DSC experiments were performed on the coated and uncoated particles. The normalised changes in heat flow, $\Delta Hf_{nor}$, at the $T_g$ clearly show that the terpolymer has been efficiently coated onto the particles.

Example 2

Investigations were carried out on the use of emulsion polymerisation techniques for in situ formation of polymer on the surface of modified carbon black. Styrene was selected as the monomer and 4,4'-azobis(4-cyanopentanoic acid) as the initiator. The carbon black was Sterling® 4620 grade (Cabot Corporation) with —$C_6H_4SO_3Na$ groups attached to the carbon black.

Three emulsion polymerization's were carried out, with the only difference being the amount of initiator used. The formulations used are given in Table 2B. The amount of polymer used was calculated to give a 20 nm coating, based upon the surface area and volume of the equivalent non-porous sphere with the same diameter as the modified carbon black.

TABLE 2B

Formulations used in the emulsion polymerization's.

| | Mass of component/g | | |
|---|---|---|---|
| Component | E1[a] | E2[a] | E3[a] |
| Deionised water | 25 | 25 | 25 |
| Styrene | 1.25 | 1.25 | 1.25 |
| Sterling (—$C_6H_4SO_3Na$) | 10 | 10 | 10 |
| 4,4'-Azobis(4-cyanopentanoic acid) | 0.0007 | 0.0312 | 0.3125 |

[a]E1, E2 and E3 denotes the three different emulsion polymerization's performed.

The polymerization's were preformed under nitrogen in a 5-necked flanged reaction flask at 70° C. Accurate weights of modified carbon black were dispersed in water (20 g) in the reaction flask. The contents of the reaction flask were stirred continuously and a flow of nitrogen gas was established to maintain an inert atmosphere. After the contents of the flask attained bath temperature, a solution of the initiator in water (5 g) was added. The total quantity of monomer was then added via a dropping funnel over a period of 15 minutes. After 5 hours the reaction flask was cooled to room temperature and filtered through a No. 4 sinter. The product was dried under vacuum at 60° C.

For the reactions using the lowest amounts of initiator (E1 and E2), unpolymerised monomer could be seen as a second layer on the water and a strong smell of styrene was also evident. For the reaction with the highest amount of initiator (E3), unreacted monomer was not detected. The E2 polymerisation was repeated, but excluding the modified carbon black; this reaction yielded a latex. The reaction products were analysed by DSC in a temperature range 0 to 200° C.

Blend Example

Cycolac SAN 29283 was blended with the two grades (Regal 80® and Sterling 4620®carbon black) of the coated and uncoated modified carbon blacks. The compounding was carried out using a Banbury mixer with the mixing conditions summarised in Table 3. The prepared compounds and their analytical data are summarised in Table 4.

TABLE 3

Banbury mixing conditions

| Parameter | Value |
|---|---|
| Rotor Speed | 175 rpm |
| Start Temperature | 80° C. |
| Ram Pressure | 3 kg $cm^{-2}$ |
| Time Flux | 83 s |
| Flux Temperature | 135° C. |
| Post Flux Mixing Time | 90 s |
| Drop Temperature | 160° C. |

Processing of the compounds into sheets was carried out by conventional compression moulding at 150° C. Tensile specimens were prepared by cutting 3 mm thick moulded sheets with a bandsaw into 150 mm×25 mm×3 mm strips. These strips were machined into dumb-bell samples to ASTM D638 standard using a routing machine and then polished to remove any surface and edge flaws. Impact specimens were cut from 6 mm thick sheets into 150 mm×25 mm×6 mm strips. The specimens were polished and notched to various depths using a milling machine and the notches sharpened by sliding a new razor blade across the notch root just prior to testing. The impact specimens were prepared and tested according to ASTM D5045-95.

TABLE 4

Blend data

| Sample Number | Theoretical CB content % | Ash content $N_2$/900° C. % | MFI at 5 kg, 230° C. g/10 min | Screen 40 mesh Specs | Screen 100 mesh specs | Weight g |
|---|---|---|---|---|---|---|
| 5A R-nf-0-50 | 34.4 | 34.58 | 6.2 | 4 | 18 | 1790 |
| 5B R-nf-0-30 | 20.6 | 20.58 | 11.9 | 3 | 29 | 1250 |
| 5C R-nf-0-10 | 6.9 | 6.93 | 13.8 | 4 | 8 | 730 |
| 6A S-nf-0-50 | 34.4 | 34.27 | 3.6 | 8 | 27 | 1820 |

TABLE 4-continued

Blend data

| Sample Number | Theoretical CB content % | Ash content N2/900° C. % | MFI at 5 kg, 230° C. g/10 min | Screen 40 mesh Specs | Screen 100 mesh specs | Weight g |
|---|---|---|---|---|---|---|
| 6B S-nf-0-30 | 20.6 | 20.47 | 12.0 | 3 | 6 | 1060 |
| 6C S-nf-0-10 | 6.9 | 6.80 | 14.9 | 3 | 13 | 850 |
| 7A R—NH$_2$-20-50 | 34.4 | 34.87 | 1.3 | not done | not done | 340 |
| 7B R—NH$_2$-20-30 | 20.6 | 21.10 | 7.9 | 6 | >200 | 1270 |
| 7C R—NH$_2$-20-10 | 6.9 | 6.49 | 12.0 | 5 | >200 | 1030 |
| 8A S—NH$_2$-20-50 | 34.4 | 34.73 | 0.2 | not done | not done | 330 |
| 8B S—NH$_2$-20-30 | 20.6 | 20.71 | 5.3 | 9 | >300 | 1170 |
| 8C S—NH$_2$-20-10 | 6.9 | 6.67 | 11.5 | 9 | >250 | 1050 |
| 9 SAN 1 Banbury pass | 0 | 0.009 | 15.3 | n.a. | n.a. | 1260 |
| 10 Cycolac SAN 29283 | 0 | n.a. | 13.5 | n.a. | n.a. | n.a. |

Example 3

Studies were carried out in order to synthesise a terpolymer (PS/BA/GMA) of styrene, butyl acrylate and glycidyl methacrylate with a lower $T_g$ than the one described in Example 1.

Styrene (Aldrich, 98%) was washed several times with 10% sodium hydroxide solution in a separating funnel, then several times with distilled water. The inhibitor-free monomer was dried over anhydrous calcium chloride before being distilled under nitrogen at reduced-pressure. Butyl acrylate (Aldrich, 97%) was washed several times with 2% sodium hydroxide solution in a separating funnel, then several times with distilled water. The inhibitor-free monomer was dried over anhydrous calcium chloride before filtering off. Azobis(isobutyronitrile) (AZBN) was purified by forming a saturated solution in toluene at 30° C. and then cooling the solution to 0° C. in an ice-water bath. Glycidyl methacrylate (Aldrich, 97%) was used as supplied.

The terpolymer was prepared by solution polymerisation in toluene at an initial solvent to monomer ratio of 70:30 by weight. AZBN was used as the initiator at a level of 0.1% by weight of monomer. The polymerisation was allowed to proceed with stirring for 30 hours at 60° C. under a nitrogen atmosphere. Two different terpolymers were prepared with different comonomer composition.

Table 5 shows the comonomer compositions used.

TABLE 5

The compositions of butyl acrylate (BA), styrene (S) and glycidyl methacrylate (GMA) used in the polymerization's

| Terpolymer | $^{wt}$BA %[a] | $^{wt}$S %[b] | $^{wt}$GMA %[c] |
|---|---|---|---|
| (PS/BA/GMA)$_1$ | 70 | 25 | 5 |
| (PS/BA/GMA)$_2$ | 90 | 5 | 5 |

[a]$^{wt}$BA % is the percentage weight of butyl acrylate in the total monomer mixture
[b]$^{wt}$S % is the percentage weight of styrene in the total monomer mixture
[c]$^{wt}$GMA % is the percentage weight of glycidyl methacrylate in the total monomer mixture

TABLE 6

The yield of the polymerisation reactions and the composition of butyl acrylate (BA), styrene (S) and glycidyl methacrylate (GMA) of the resulting terpolymers

| Terpolymer | Yield/% | $^{wt}$BA %[a] | $^{wt}$S %[b] | $^{wt}$GMA %[c] |
|---|---|---|---|---|
| (PS/BA/GMA)$_1$ | 58 | 40 | 53 | 7 |
| (PS/BA/GMA)$_2$ | 63 | 95 | 2 | 3 |

[a]$^{wt}$BA % is the percentage weight of butyl acrylate in the terpolymer
[b]$^{wt}$S % is the percentage weight of styrene in the terpolymer
[c]$^{wt}$GMA % is the percentage weight of glycidyl methacrylate in the terpolymer The terpolymer (PS/BA/GMA)$_1$ shows a $T_g$ at 14° C. while the terpolymer (PS/BA/GMA)$_2$, which has greater amount of butyl acrylate, has a $T_g$ at −30° C.

Terpolymer (PS/BA/GMA)$_2$ was selected as the one for coating the carbon black or modified carbon black particles due to its low $T_g$ (−30° C.). The coating was carried out via the solution evaporation method using the same procedure as described in the previous report. The various particles were dispersed into the as-prepared terpolymer solution, followed by the controlled evaporation of the solvent. The coating of the samples, resulted in a 20 nm thick coat and a hard solid after drying at 40° C. under vacuum.

The coated samples were characterised by DSC which show similar traces to that of the terpolymer exhibiting a single $T_g$ around −30° C.

Large quantities (~800 g) of the polymer-coated modified carbon blacks were prepared from the solution evaporation method. The polymer used for the coating was the terpolymer (PS/BA/GMA)$_2$ of styrene, butyl acrylate and glycidyl methacrylate. The targeted coating thickness of the modified carbon blacks with the specially-synthesised terpolymer was 20 nm. A mortar was used for grinding the coated, modified carbon blacks into fine powders. The coated, modified carbon blacks were subsequently compounded with SAN.

Cycolac SAN 29283 was blended with the two grades (Regal 80® and Sterling 4620® carbon blacks) of coated and uncoated carbon blacks. The compounding was carried out using a Banbury mixer with the mixing conditions summarised in Table 7. The prepared compounds and their analytical data are summarised in Table 8.

CPI carried out the injection moulding of tensile specimens, according to ISO R527 type II, for some of the formulations described in Table 8.

TABLE 7

Banbury mixing conditions.

| Parameter | Value |
|---|---|
| Rotor Speed | 175 rpm |
| Start Temperature | 80° C. |
| Ram Pressure | 3 kg cm$^{-2}$ |
| Time Flux[a] | 35–60 s |
| Flux Temperature[a] | 120–150° C. |
| Post Flux Mixing Time | 90 s |
| Drop Temperature[a] | 165–190° C. |

[a]Value dependent on mixed formulation

TABLE 8

Blend data

| Sample Number | Theoretical CB content % | Ash content N2/900° C. % | MFI at 5 kg, 230° C. g/10 min | Screen 40 mesh Specs | Screen 100 mesh specs | Weight g |
|---|---|---|---|---|---|---|
| R-nf-0-50 | 34.4 | not done | not done | Not done | not done | 610 |
| R-nf-0-30[a] | 20.6 | 20.5 | 11.1 | 3 | 45 | 605 |
| S-nf-0-50 | 34.4 | not done | not done | Not done | not done | 640 |
| S-nf-0-30[a] | 20.6 | 20.4 | 8.5 | 2 | 35 | 870 |
| R—NH$_2$-20(BA)-50 | 34.4 | 36.4 | 1.3 | Not done | not done | 350 |
| R—NH$_2$-20(BA)-30[a] | 20.6 | 22.0 | 7.0 | 6 | 120 | 870 |
| R—NH$_2$-20(BA)-10[a] | 6.9 | 7.2 | 14.9 | 6 | 120 | 670 |
| S—NH$_2$-20(BA)-50 | 34.4 | 34.0 | 1.4 | Not done | not done | 350 |
| S—NH$_2$-20(BA)-30[a] | 20.6 | 20.3 | 8.5 | 0 | 20 | 900 |
| S—NH$_2$-20(BA)-10[a] | 6.9 | 6.6 | 18.7 | 2 | 30 | 650 |

[a]Compositions also injection moulded

Example 4

Investigations were also carried out on the use of emulsion polymerisation techniques for the in situ formation of polymer on the surface of modified carbon blacks. Using two different monomers, styrene and butyl acrylate, and two different initiators. 4.4'-azobis(4-cyanopentanoic acid) and ammonium persulphate. The carbon black used was Sterling 4620 grade with —C$_6$H$_4$SO$_3$Na groups attached The materials used in the emulsion polymerization's were styrene (Aldrich, 98%), butyl acrylate (Aldrich, 97%) (purified as described in Section 3.1.1), deionised water which was boiled under a N$_2$ atmosphere in order to eliminate dissolved O$_2$, modified carbon black which was washed with methanol and dried to constant weight, and the initiators, 4,4'-azobis(4-cyanopentanoic acid) (Aldrich, 75+%) and ammonium persulphate (Aldrich, 99.0%), both used as supplied.

Thirty emulsion polymerization's were carried out in total for the three monomer/initiator combinations studied. The difference between reactions within each combination was the level of initiator used. The combinations studied were as follows:

a) Styrene/4,4'-azobis(4-cyanopentanoic acid)
b) Styrene/ammonium persulphate
c) Butyl acrylate/ammonium persulphate The polymerization's were performed in a sealed system at 70° C. The calculation of the amount of polymer to be formed to give a 20 nm coating was based upon the surface area and volume of the equivalent non-porous sphere with the same diameter as the functionalised carbon black. The polymerization's were carried out as follows.

A reaction flask was initially charged with water (25 g) and modified carbon black (10 g). The contents of the reaction flask were stirred continuously and a flow of nitrogen established. After the contents of the flask attained bath temperature, a solution of the initiator in water (5 g) was added and the system sealed. The total quantity of monomer was then added via a dropping funnel over a period of 15 minutes. After 10 hours the reaction flask was cooled to room temperature and the reaction product collected by filtration through a No. 4 sinter, followed by drying under vacuum at 60° C. Before filtering an aliquot was removed in order to calculate the conversion of the reaction using gas-liquid chromatography (GLC).

The formulations used in the emulsion polymerization's are given in Tables 9, 10 and 11.

GLC was used to determine the amount of unreacted monomer in the aliquot removed after reaction in order to calculate the conversion level of the emulsion polymerisation. Anala R methanol was added to the aliquot in order to induce the miscibility of the water and monomer. GLC was carried out using a Perkin-Elmer Autosystem Gas Chromatograph. Quantitative analysis was carried out using propan-1-ol as an internal standard.

TABLE 9

Formulation used in the emulsion polymerization's of the styrene/ 4,4'-azobis(4-cyanopentanoic acid) combination.

| Component | Mass of component/g E1–E11 |
|---|---|
| Deionised water | 30 |
| Styrene | 1.25 |
| Sterling (—C$_6$H$_4$SO$_3$Na) | 10 |
| 4,4'-Azobis(4-cyanopentanoic acid) | 0.0007–1[a] |

[a]Initiator content varies between 0.0007 and 1.0000 g for the 11 reactions carried out.

TABLE 10

Formulations used in the emulsion polymerization's of the styrene/ ammonium persulphate combination.

| | Mass of component/g | | |
|---|---|---|---|
| Component | E12 | E13 | E14 |
| Deionised water | 30 | 30 | 30 |
| Styrene | 1.29 | 1.28 | 1.26 |
| Sterling (—C$_6$H$_4$SO$_3$Na) | 10 | 10 | 10 |

TABLE 10-continued

Formulations used in the emulsion polymerization's of the styrene/ammonium persulphate combination.

| | Mass of component/g | | |
|---|---|---|---|
| Component | E12 | E13 | E14 |
| Persulphate | 0.33 | 0.66 | 1.00 |
| Remaining monomer | 0.96 | 0.64 | 0.57 |
| Conversion/%[a] | 26 | 50 | 55 |

[a]Determined by Gas-Liquid Chromatography (GLC)

TABLE 11

Formulations used in the emulsion polymerization's of the butyl acrylate/ammonium persulphate combination.

| | Mass of component/g | | | |
|---|---|---|---|---|
| Component | E15 | E16 | E17 | E18 |
| Deionised water | 30 | 30 | 30 | 180 |
| Butyl acrylate | 1.49 | 1.26 | 1.3 | 7.92 |
| Sterling (—$C_6H_4SO_3Na$) | 10 | 10 | 10 | 60 |
| Persulphate | 0.32 | 0.45 | 0.65 | 4.08 |
| Remaining monomer | 0.99 | 0.71 | None | None |
| Conversion/%[a] | 33 | 43 | 100 | 100 |

[a]Determined by Gas-Liquid Chromatography (GLC).

IR spectroscopy was used to detect the presence of polymer in the emulsion polymerisation products. The sedimentation of the emulsion polymerisation products was used as another indicator of the success of the polymerisation reaction. Therefore, this indicates the polymer formed homogeneously on the modified carbon black particles in the successful emulsion polymerization's.

Example 5

Investigations were also carried out on the emulsion routes:
 a) Emulsion polymerisation routes using:
   1) a single monomer, butyl acrylate (BA)
   2) a mixture of monomers, butyl acrylate (BA) and allyl methacrylate (ALMA). The effect of the relative monomer ratio has also been analysed.
 b) Variation of the coating thickness only the carbon black or modified carbon black.

Deionised water, which was boiled under a $N_2$ atmosphere in order to eliminate dissolved $O_2$, was used in all preparations. The two monomers used were butyl acrylate (BA, Aldrich, 97%) and allyl methacrylate (ALMA, Aldrich, 98%). Butyl acrylate was used after being washed several times with 2% sodium hydroxide. Allyl methacrylate was used as supplied. The modified carbon black (Sterling 4620® carbon black with attached —$C_6H_4SO_3Na$ groups, and attached —$C_6H_4CH=CH_2$ groups) was washed with methanol and dried to constant weight, and the initiator, ammonium persulphate (Aldrich, 99.0%) was used as supplied. Polymerization's were carried out using a form of semi-continuos emulsion polymerisation.

The water and modified carbon black were charged in a round-bottomed flask kept in a water bath at 70° C. The flask was purged with nitrogen. After the mixture had reached bath temperature, the initiator was added and the monomers were pumped at a fixed rate into the reactor using a Watson-Marlow peristaltic pump. The reactions were allowed to proceed for 10 hours before cooling to room temperature and filtering through a No. 4 sinter and drying under vacuum at 60° C. Extra initiator in water was added after 3 hours reaction time for preparing coating of thickness greater than 15 nm.

Emulsion polymerisation products were analysed by weight-loss and extraction experiments, gas-liquid chromatography (GLC) and differential scanning calorimetry (DSC). A gravimetric method, based on weight loss of the sample, and an extraction experiment were used to calculate quantitatively the amount of polymer present in the samples. These methods are the followings:

a) Furnace Method

In this method the well-dried emulsion polymerisation product was kept in a furnace at 550° C. for 3 hours in order to degrade the polymer. Samples of the uncoated modified carbon black were also treated under the same conditions.

b) Extraction Method

In this method the well-dried emulsion polymerisation product was extracted with chloroform. The Soxhlet extractions were carried out for 3 hours at the boiling point of the chloroform. Samples of the uncoated modified carbon black were also treated under the same conditions.

Gas-liquid chromatography (GLC) was used to determine the amount of unreacted monomer. GLC was carried out using a Perkin-Elmer 8500 Gas Chromatograph. Solutions (1 μl) were injected at an inlet pressure of 7.0 psi into a Carbowax 20M column (length 25 m, inside diameter 0.3 mm). The temperature of the oven was increased from 60 to 160° C. at a rate of 7° C. $min^{-1}$. For this technique an aliquot was removed from a reaction in order to calculate the conversion level in the emulsion polymerisation AnalaR methanol was added to the aliquot in order to induce the miscibility of the water and monomer. Quantitative analysis fleas carried out using propan-1-ol as an internal standard.

DSC experiments were performed on the reaction products in order to detect the polymer. Experiments were performed under nitrogen at a heating rate of 20° C. $min_{-1}$ using a DuPont Thermal Analyst 2000 instrument with a DuPont 910 cell base fitted with a DSC cell. Before analysis, the products were well dried in a vacuum oven at 40° C. to constant weight.

Several emulsion polymerization's were carried out with different monomer compositions. Modified carbon black (Sterling® carbon black with attached —$C_6H_4SO_3Na$ and —$C_6H_4CH=CH_2$ groups) was used in all the emulsion polymerization's due to its excellent water dispersibility. The targeted coating thickness was 10 nm in all cases. Three representative examples of the emulsions polymerization's carried out are shovel in Table 12.

TABLE 12

Formulations used for the 10 nm coating thickness of modified carbon blacks (—$C_6H_4SO_3Na$/—$C_6H_4CH=CH_2$) groups.

| | Mass of component/g | | |
|---|---|---|---|
| | E1 | E2 | E3 |
| | 0 mol % ALMA | 1 mole % ALMA | 2 mol % ALMA |
| Component | 100 mol % BA | 99 mole % BA | 98 mol % BA |
| Deionised water | 300 | 300 | 300 |
| BA | 7.83 | 7.42 | 7.49 |
| ALMA | — | 0.11 | 0.19 |
| Sterling | 60 | 60 | 60 |
| Persulphate | 3.92 | 3.83 | 3.95 |
| Remaining BA | None | None | None |
| Remaining ALMA | — | None | None |
| Conversion/%[a] | 100 | 100 | 100 |

[a]Determined by Gas-Liquid Chromatography (GLC).

In these studies butyl acrylate was used due to the rubbery nature of the homopolymer. ALMA was also introduced in some of the reactions to provide crosslinking. The crosslinking can increase the shear resistance by decreasing the movement of polymer molecules and prevents loss of the coating during blending. Additionally, the double bond functionality introduced in the modified carbon black can also participate in the reactions.

The results obtained from the weight-loss and extraction experiments are reported in Table 13.

TABLE 13

Results from the weight-loss and extraction experiments for the emulsion polymerization's in Table 12.

| | | Weight loss/% | | | |
|---|---|---|---|---|---|
| Method | Loss/% | E1<br>0 mol % ALMA<br>100 mol % BA | E2<br>1 mol % ALMA<br>99 mol % BA | E3<br>2 mol % ALMA<br>98 mol % BA | Sterling-<br>$C_6H_4SO_3Na/$<br>$—C_6H_4CH=CH_2$ |
| Extraction | Overall Loss/%[a] | 6.6 | 4.7 | 3.1 | 2.8 |
| | Polymer Loss/%[b] | 3.8 | 1.9 | 0.3 | — |
| Furnace | Overall Loss/%[a] | 22.6 | 22.5 | 22.3 | 15.7 |
| | Polymer Loss/%[b] | 6.9 | 6.8 | 6.6 | — |
| Theoretical | Polymer Loss/%[c] | 11.5 | 11.1 | 11.3 | — |

[a] Overall loss/% = $\dfrac{\text{Initial weight (g)} - \text{Final weight (g)}}{\text{Initial weight (g)}} \times 100$

[b] Polymer loss/% = Overall loss (%) − Overall loss of CB (%)

[c] Theoretical polymer content/% = $\dfrac{g_{BA} + g_{ALMA}}{g_{CB} + g_{BA} + g_{ALMA}} \times 100$ With the selected polymer coating composition (98 mol % BA/2 mol % ALMA), the effect of varying the polymer coating thickness was investigated. Several emulsion polymerization's of Sterling® carbon black having attached ($—C_6H_4SO_3Na/—C_6H_4CH=CH_2$ groups) with a comonomer composition of 2 mol % ALMA, 98 mol % BA were carried out. Table 3 shows the compositions of the most representative polymerization's.

E6 polymerization did not go to complete reaction with the amount of initiator used, indicating that the addition of an extra initiator was necessary for the emulsion polymerization's with a coating thickness of 20 nm or higher.

TABLE 14

Formulations used for the coating of Sterling ® carbon black having attached
($—C_6H_4SO_3Na/—C_6H_4CH=CH_2$) groups with a comonomer
composition of 2 mol % ALMA, 98 mol % BA.

| | Mass of component/g | | | | | | | |
|---|---|---|---|---|---|---|---|---|
| Component | E4<br>(10 nm)[a] | E5<br>(15 nm) | E6<br>(20 nm) | E7<br>(20 nm) | E8<br>(30 nm) | E9<br>(35 nm) | E10<br>(65 nm) | E11<br>(no black) |
| Deionised water | 50 | 50 | 50 | 50 | 50 | 50 | 50 | 50 |
| BA | 1.32 | 1.94 | 2.66 | 2.69 | 4.31 | 5.44 | 11.86 | 2.67 |
| ALMA | 0.03 | 0.04 | 0.06 | 0.06 | 0.09 | 0.13 | 0.26 | 0.06 |
| Sterling | 10 | 10 | 10 | 10 | 10 | 10 | 10 | — |
| Persulphate | 0.72 | 0.65 | 0.65 | 0.68[c] | 0.72[c] | 0.72[c] | 0.71[c] | 0.66 |
| Remaining BA[b] | None | None | 0.37 | None | None | None | None | None |
| Remaining ALMA[b] | None | None | None | None | None | None | None | None |
| Conversion/%[b] | 100 | 100 | 86 | 100 | 100 | 100 | 100 | 100 |

[a] Figures in parentheses are targeted coating thicknesses.
[b] Determined by Gas-Liquid Chromatography (GLC).
[c] 0.41 g added after 3 hours of reaction.

TABLE 15

Results from the weight-loss and extraction experiments for the emulsion polymerization's in Table 3.

| Method | Loss/% | Weight loss/% | | | | | | | Sterling —$C_6H_4SO_3Na$/ —$C_6H_4CH\!=\!CH_2$ |
|---|---|---|---|---|---|---|---|---|---|
| | | E4 (10 nm)[a] | E5 (15 nm) | E6 (20 nm) | E7 (20 nm) | E8 (30 nm) | E9 (35 nm) | E10 (65 nm) | |
| Extraction | Overall Loss/%[b] | 3.2 | 4.6 | 4.7 | 5.1 | 7.1 | 8.0 | 9.3 | 2.8 |
| | Polymer Loss/%[c] | 0.4 | 1.8 | 1.9 | 2.3 | 4.3 | 5.2 | 6.5 | — |
| Furnace | Overall Loss/%[b] | 22.2 | 22.9 | 24.1 | 29.54 | 33.04 | 41.32 | 59.49 | 15.7 |
| | Polymer Loss/%[c] | 6.5 | 7.2 | 8.4 | 13.8 | 17.34 | 25.62 | 43.79 | — |
| Theoretical | Polymer Loss/%[d] | 11.9 | 16.5 | 18.4 | 21.6 | 30.5 | 35.77 | 54.8 | — |

[a]Figures in parentheses are targeted coating thicknesses.

[b]Overall loss/% = $\dfrac{\text{Initial weight (g)} - \text{Final weight (g)}}{\text{Initial weight (g)}} \times 100$

[c]Polymer loss/% = Overall loss (%) − Overall loss of CB (%)

[d]Theoretical polymer content/% = $\dfrac{g_{BA} + g_{ALMA}}{g_{CB} + g_{BA} + g_{ALMA}} \times 100$

Example 6

From the studies of the different emulsion polymerizations E3 in Example 5 was selected as the formulation to be scaled up for large-scale emulsion polymerization.

Two batches (~450 g) of the polymer-coated modified carbon black were prepared from carbon black having attached —$C_6H_4SO_3Na$/—$C_6H_4CH\!=\!CH_2$ groups via the emulsion polymerization method. The monomers used for the coating were butyl acrylate (BA) and allyl methacrylate (ALMA). The targeted coating thickness was 10 nm. The polymerization procedure was as described above. After the reaction, the products obtained were filtered off, dried and ground into fine powders. Characterization of the products was carried out by gas liquid chromatography (GLC), differential scanning calorimetry (DSC) and thermogravimetry (TG). GLC indicated the reaction was complete; DSC showed the $T_g$ of the polymer at −43° C. TG gave a weight loss of approximately 10.5%.

After characterization the two batches were mixed together and subsequently compounded with SAN. The composition details of the polymer-coated modified carbon black are given in Table 16.

Cycolac SAN 29283 was blended with the coated modified carbon black. The compounding was carried out using a Banbury mixed with the mixer conditions summarized in Table 17. The prepared compounds and their analytical data are summarized in Table 18.

TABLE 17

Banbury mixing conditions of SAN with the coated nidufued carbon black.

| Parameter | Value |
|---|---|
| Rotor Speed | 175 Rpm |
| Start Temperature | 80° C. |
| Ram Pressure | 3 Kg cm$^{-2}$ |
| Time Flux | 55–140 S |
| Flux Temperature[a] | 145–170° C. |
| Post Flux Mixing Time | 90 S |
| Drop Temperature | 160–190° C. |

[a]Value dependent on mixed formulation

TABLE 16

Composition details of the polymer-coated modified carbon black.

| Sample Code | Carbon Black Grade | Group Attached | Carbon Black Content/% | Polymer Content/% |
|---|---|---|---|---|
| E-100A-10 | Sterling ® 4620 | —$C_6H_4SO_3Na$/ —$C_6H_4CH\!=\!CH_2$ | 88.6 | 11.4 |

TABLE 18

Blend data.

| Product Code | Theoretical CB content % | Ash content N2/900° C. % | MFI at 5 kg, 230° C. g/10 min | Screen 40 mesh Specs | Screen 100 mesh specs |
|---|---|---|---|---|---|
| E-100A-10-50 | 34.4 | 33.6 | 1.3 | not done | not done |
| E-100A-10-30[a] | 20.6 | 20.3 | 5.7 | 3 | 10 |
| E-100A-10-10[a] | 6.9 | 6.6 | 11.1 | 1 | 11 |

[a] Compositions also injection molded.

Processing of the compounds was carried out as described previously. Tensile specimens were produced according to ASTM D638 standard. The impact specimens were prepared and tested according to ASTM D5045-95. Rectangular bars (45 mm×10 mm×3 mm) were also prepared for analysis by Dynamic Mechanical Thermal Analysis (DMTA).

Injection mauling of the tensile specimens were carried out according to ISO R527 type II for some of the formulations described in Table 18.

The following series of compounds, containing SAN and coated modified carbon black were characterized (Table 19):

Compounds containing SAN and the solution evaporation-coated modified carbon black. The polymer used for the coating was the terpolymer (PS/BA/GMA) of styrene, acrylonitrile and glycidyl methacrylate previously described. Two grades of modified carbon black were coated by this method.

Compounds containing SAN and the emulsion-coated modified carbon black (Table 18).

Tensile tests were performed according to ASTM D638 using an Instron 1122 tensile testing machine in order to obtain the tensile properties of the various compounds. The tests were carried out using a gauge length of 64 mm and a crosshead speed of 10 mm min$_{-1}$. An Instron 2630-30 extensometer was used to measure strains up to 10% accurately. A total of six specimens were tested for each material and the mean values of the mechanical properties calculated.

Table 20 shows the tensile properties of the compounds. The values of the unfilled SAN and uncoated-carbon black filled SAN compounds are also given for comparative purposes.

TABLE 19

Characteristics of the compounds.

| Sample code[a] | CB grade | Group Attached | Coating composition[b] | Theoretical CB content/ % | Coating thickness/ nm |
|---|---|---|---|---|---|
| R—NH2-20(BA)-50 | Regal 80 ® | —C$_6$H$_4$NH$_2$ | PS/BA/GMA | 34.4 | 20 |
| R—NH2-20(BA)-30 | Regal 80 ® | —C$_6$H$_4$NH$_2$ | PS/BA/GMA | 20.6 | 20 |
| R—NH2-20(BA)-10 | Regal 80 ® | —C$_6$H$_4$NH$_2$ | PS/BA/GMA | 6.9 | 20 |
| S—NH2-20(BA)-50 | Sterling 4620 ® | —C$_6$H$_4$NH$_2$ | PS/BA/GMA | 34.4 | 20 |
| S—NH2-20(BA)-30 | Sterling 4620 ® | —C$_6$H$_4$NH$_2$ | PS/BA/GMA | 20.6 | 20 |
| S—NH2-20(BA)-10 | Sterling 4620 ® | —C$_6$H$_4$NH$_2$ | PS/BA/GMA | 6.9 | 20 |
| E-100A-10-50 | Sterling 4620 ® | —C$_6$H$_4$SO$_3$Na/ C$_6$H$_4$CH=CH$_2$ | BA/ALMA | 34.4 | 10 |
| E-100A-10-30 | Sterling 4620 ® | —C$_6$H$_4$SO$_3$Na/ C$_6$H$_4$CH=CH$_2$ | BA/ALMA | 20.6 | 10 |
| E-100A-10-10 | Sterling 4620(RL) | —C$_6$H$_4$SO$_3$Na/ C$_6$H$_4$CH=CH$_2$ | BA/ALMA | 6.9 | 10 |

[a] The samples coded as R—NH2-20(BA) and S—NH2-20(BA) were coated via the solution evaporation method. The samples coded as E-100A-10 were coated via the emulsion polymerization method
[b] PS/BA/GMA has a composition of 2/95/3% and BA/ALMA of 98/2% by weight

TABLE 20

Tensile properties of the filled and unfilled SAN.

| Material | wt(CB)[a] /% | E[b]/GPa | σ$_u$[c]/MPa | ε$_u$[d]/% |
|---|---|---|---|---|
| R-nf-0-10 | 6.9 | 2.30 ± 0.61 | 48.9 ± 4.0 | 2.2 ± 0.3 |
| R-nf-0-30(e) | 20.6 | 2.85 ± 0.11 | 41.6 ± 5.1 | 1.4 ± 0.1 |
| R-nf-0-50 | 34.4 | 3.56 ± 0.17 | 29.6 ± 6.3 | 0.9 ± 0.2 |
| S-nf-0-10 | 6.9 | 2.36 ± 0.18 | 43.1 ± 1.5 | 2.1 ± 0.1 |
| S-nf-0-30(e) | 20.6 | 3.16 ± 0.14 | 43.6 ± 1.8 | 1.3 ± 0.2 |
| S-nf-0-50 | 34.4 | 3.56 ± 0.31 | 29.3 ± 4.6 | 0.8 ± 0.1 |
| R—NH$_2$-20(BA)-10[e] | 6.9 | 2.33 ± 0.11 | 46.3 ± 2.5 | 2.2 ± 0.1 |
| R—NH$_2$-20(BA)-30[e] | 20.6 | 2.06 ± 0.05 | 38.5 ± 2.6 | 2.4 ± 0.1 |
| R—NH$_2$-20(BA)-50 | 34.4 | 1.59 ± 0.09 | 21.0 ± 3.5 | 1.6 ± 0.2 |
| S—NH$_2$-20(BA)-10[e] | 6.9 | 2.34 ± 0.03 | 50.2 ± 1.8 | 2.6 ± 0.3 |

TABLE 20-continued

Tensile properties of the filled and unfilled SAN.

| Material | wt(CB)[a]/% | E[b]/GPa | $\sigma_u$[c]/MPa | $\epsilon_u$[d]/% |
|---|---|---|---|---|
| S—NH$_2$-20(BA)-30[e] | 20.6 | 1.79 ± 0.08 | 33.8 ± 2.4 | 2.7 ± 0.1 |
| S—NH$_2$-20(BA)-50 | 34.4 | 1.29 ± 0.07 | 16.7 ± 2.6 | 1.7 ± 0.1 |
| E-100A-10-10 | 6.9 | 2.82 ± 0.21 | 47.8 ± 2.4 | 1.9 ± 0.1 |
| E-100A-10-30 | 20.6 | 2.91 ± 0.15 | 40.9 ± 4.5 | 1.6 ± 0.1 |
| E-100A-10-50 | 34.4 | 3.31 ± 0.10 | 23.3 ± 1.6 | 0.7 ± 0.1 |
| SAN1 | 0 | 2.02 ± 0.43 | 58.0 ± 8.5 | 3.4 ± 1.0 |

[a]wt(CB) is the theoretical carbon black content in %
[b]E is the tensile modules calculated as the secant at 0.1% elongation
[c]$\sigma_u$ is the ultimate tensile stress
[d]$\epsilon_u$ is the ultimate tensile strain
[e]Compositions also injection molded.

Three-point bend single edge-notched impact testing was performed using a Ceast 6545 digital pendulum, (release angle set at 15°) interfaced to a MK4 microprocessor together with a PC. The standard specimen was a single edge-notched beam loaded in three-point bending width a support span S (=96.0 mm) nominally equal to four times the width, W.

The notch-to-depth ratio, (a/w) was 0.50±0.05 and for each material at least 6 specimens were analyzed and mean results calculated. The measured values of the fracture energy, $G_{Ic}$, as calculated from ASTM D 5045-95, are presented in Table 21.

TABLE 21

Variation of fracture energy, $G_{Ic}$, with weight percentage of carbon black, wt(CB).

| Material | wt(CB)[a]/% | $C_{Ic}$[b]/Jm$^{-2}$ |
|---|---|---|
| R-nf-0-10 | 6.9 | 456+66 |
| R-nf-0-30 | 20.6 | 291+80 |
| R-nf-0-50 | 34.4 | 216+49 |
| S-nf-0-10 | 6.9 | 315+27 |
| S-nf-0-30 | 20.6 | 272+63 |
| S-nf-0-50 | 34.4 | 201+24 |
| R—NH$_2$-20(BA)-10 | 6.9 | 756+71 |
| R—NH$_2$-20(BA)-30 | 20.6 | 1646+250 |
| R—NH$_2$-20(BA)-50 | 34.4 | 1648+200 |
| S—NH$_2$-20(BA)-10 | 6.9 | 758+120 |
| S—NH$_2$-20(BA)-30 | 20.6 | 1684+164 |
| S—NH$_2$-20(BA)-50 | 34.4 | 2119+230 |
| E-100A-10-10 | 6.9 | 288+38 |
| E-100A-10-30 | 20.6 | 228+21 |
| E-100A-10-50 | 34.4 | 173+4 |
| SAN1 | 0 | 1104+152 |

[a]wt(CB) is the theoretical carbon black content in %
[b]$G_{Ic}$ is the fracture energy as calculated from ASTM D 5045-95

Figure 5A:
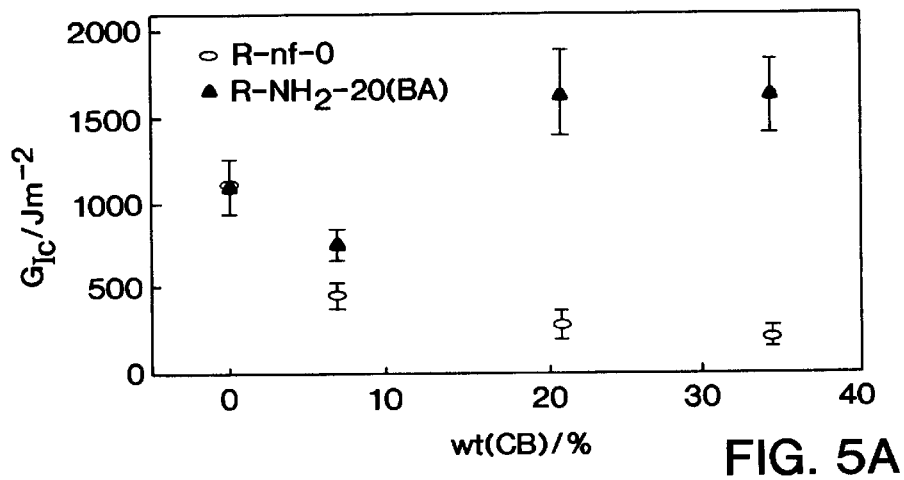
FIGS. 5(a)–(c) are graphs depicting the variation in fracture energy for polymer matrices containing either conventional carbon black, solution polymer coated modified carbon black, or emulsion polymer coated modified carbon black.
Figure 5B:
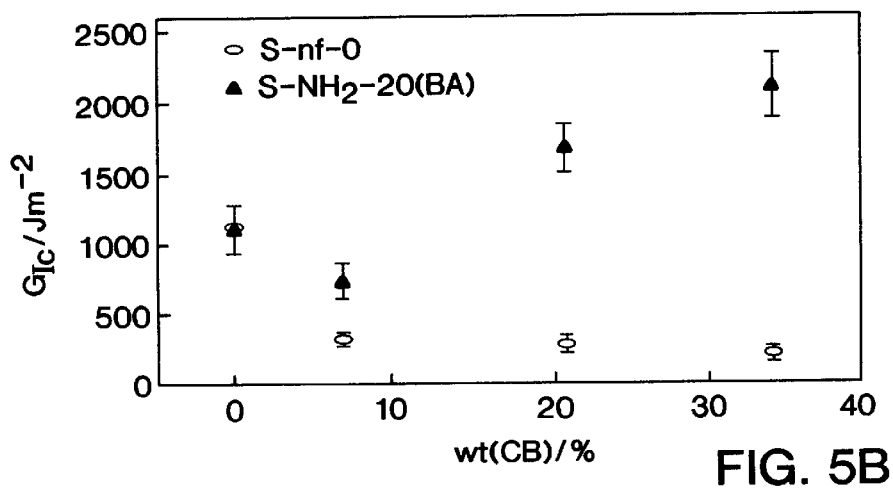
Figure 5C:
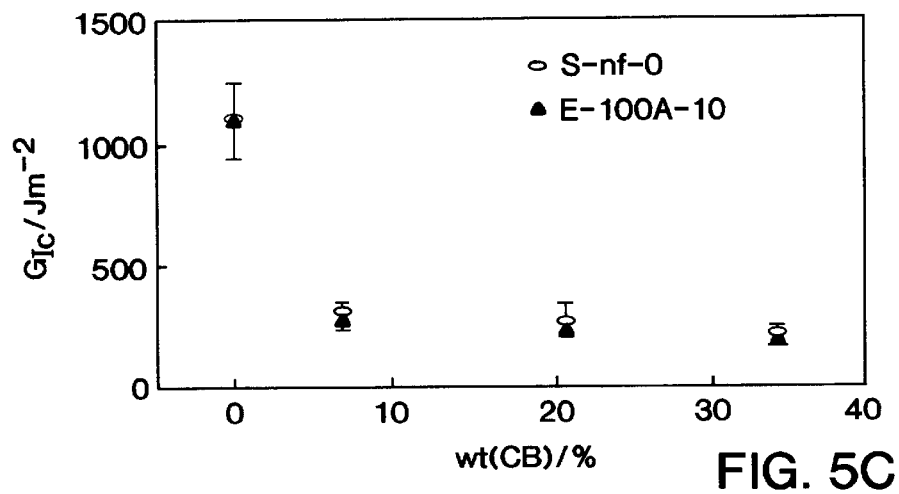

FIGS. 5(a)–(c) shows the effect of carbon black content upon $G_{Ic}$. There is a significant decrease in the $G_{Ic}$ value with increasing carbon black content for the uncoated carbon black compounds. This trend is the same for the emulsion-coated modified carbon blacks. In contrast the solution-coated compounds show the opposite trend, with $G_{Ic}$ increasing as the filler content increases. The filled SAN was shown to be tougher than the unfilled material even at 50% filler content.

Example 7

Deionised water, which was boiled under a N$_2$ atmosphere in order to eliminate dissolved O$_2$, was used in all preparations. The two monomers used were butyl acrylate (BA, Aldrich, 97%) and allyl methacrylate (ALMA, Aldrich, 98%). Butyl acrylate was used after being washed several times with 2% sodium hydroxide as described previously. Allyl methylacrylate was used as supplied. The carbon black Sterling (—C$_6$H$_4$SO$_3$Na/C$_6$H$_4$CH=CH$_2$) (sample number 010-100A), was washed with methanol and dried to constant weight, and the initiator, ammonium persulphate (Aldrich, 99.0%) was used as supplied.

Polymerizations were carried out using a form of semi-continuous emulsion polymerization. The water and carbon black were charged in a round-bottomed flask kept in a water bath at 70° C. The flask was purged with nitrogen. After the mixture had reached bath temperature, the initiator was added and the monomers were pumped at a fixed rate into the reactor using a Watson-Marlow peristaltic pump. The extra amount of initiator (disolved in water) was also added in a continuous way over a 3 hours period using a syringe pump. This slow rate of adding of the initiator (0.23 ml min$^{-1}$) was chosen to avoid destabilisation of the reaction which may occur when all the initiator is added in one step.

Aliquots (~3 g) were taken at regular intervals using a syringe and analysed using gas liquid chromatography (GLC) to determine the level of unreacted monomer. The polymerisation reactions were allowed to proceed until GLC indicated complete conversion. Later the polymerization's were cooled to room temperature, filtered through a No. 4 sinter and dried under vacuum at 60° C. Table 22 shows the compositions used in each emulsion polymerisation.

TABLE 22

Formulations used for the coating of Sterling (—C$_6$H$_4$SO$_3$Na/—C$_6$H$_4$CH=CH$_2$) with a comonomer composition of 2 mol % ALMA, 98 mol % BA.

| | Mass of component/g | |
|---|---|---|
| Component | E1 (20 nm)[a] (E-100A-20)[b] | E2 (30 nm)[a] (E-100A-30)[b] |
| Sterling | 50 | 50 |
| Water | 250 | 250 |
| Initiator | 3.32[d] | 3.30[d] |
| BA | 13.19 | 21.55 |
| ALMA | 0.27 | 0.46 |
| Conversion/%[c] | 100 | 100 |

[a]Targeted coating thicknesses.
[b]Product code.
[c]Determined by Gas-Liquid Chromatography (GLC).
[d]2.31 g of initiator (in 25 ml of water) added in a continuous way after 2.5 hours reaction.

Kinetic studies were carried out by detecting the amount of unreacted monomer remaining in the aliquots. The studies indicated a high level (~90%/) of instantaneous conversion during the initial stages of the polymerization (0–120 min). Next the instantaneous conversions started to decrease until the end of monomer addition. This decrease was more significant for E2 (30 nm coating). From this point, the instantaneous conversion steadily increased until 100% conversion was obtained 300 minutes after the initiation of the reaction.

For each of the scaling-ups (E-100A-20 and E-100A-30), two batches of the polymer-coated carbon black were prepared. As mentioned earlier, the carbon black was washed and dried Sterling (—C$_6$H$_4$SO$_3$Na/—C$_6$H$_4$CH=CH$_2$) (sample number 010-100A); the monomers used for the coating were butyl acrylate (BA) and allyl methacrylate (ALMA) in a ratio 98:2 mol %. The targeted coating thickness was 20 nm for the sample named E-100A-20 and 30 nm for E-100A-30. The polymerization procedure was described above. After the reaction, the products obtained were filtered off, dried and ground into fine powders. Table 23 sets forth the composition details of the scaling-up of the coated carbon blacks.

Dispersibility experiments were also carried out on the scaling-up products. Small amounts (~1 g) of the dried products (E-100A-10, E-100A-20 and E-100A-30) were dispersed in water (~10 g) and allowed to settle. The experiment showed that the dispersibility in water was poorer with increasing coating thickness, observing that the sedimentation of E-100A-30 and E-100A-20 is very quick. The sedimentation of E-100A-10 required longer periods of time. These experiments showed that the polymer was successfully coated onto the carbon black and also showed, qualitatively, the effects of the different coating thicknesses.

TABLE 23

Composition details of the polymer-coated carbon black Sterling (—$C_6H_4SO_3Na$/ —$C_6H_4CH=CH_2$) with a comonomer composition of 2 mol % ALMA, 98 mol % BA

| Sample Code | Carbon Black | Functional Group | Target Thickness/nm | Filler Composition Polymer/% | Carbon Black/% |
|---|---|---|---|---|---|
| E-100A-20 | Sterling 4620 010–100A | —$C_6H_4SO_3Na$/ —$C_6H_4CH=CH_2$ | 20 | 22.0 | 78.0 |
| E-100A-30 | Sterling 4620 010–100A | —$C_6H_4SO_3Na$/ —$C_6H_4CH=CH_2$ | 30 | 31.0 | 69.0 |

DSC experiments were performed on the reaction products in order to detect the polymer-coating. Experiments were performed under nitrogen at a heating rate of 20° C. min$^{-1}$ using a DuPont Thermal Analyst 2000 instrument with a DuPont 910 cell base fitted with a DSC cell. The products were well dried in a vacuum oven at 40° C. to constant weight before analysis.

The scaling-up products were also characterized by IR spectroscopy. Infrared spectra were obtained using KBr discs and a Perkin-Elmer 2000 FT-IR spectrometer. The main features of the IR spectra of the polymer-coating (BA/ALMA) are the strong peaks at 1735 cm$^{-1}$ due to C=O stretching and a strong band at 1160 cm$^{-1}$ which is attributed to C—O stretching vibrations. The IR spectra of the scaling-up products also shows these peaks were due to the butyl acrylate although they are not as strong as the pure polymer due to the high level of noise produce by the carbon black.

Two sets of compounds were prepared; the first set was prepared by blending Cycolac SAN 29283 with the coated carbon black (E-100A-20) in various proportions, and the second set by blending the SAN with E-100A-30. The compounding was carried out using a Banbury with the mixing conditions summarized in Table 24. The prepared compounds and their analytical data are summarized in Table 25.

TABLE 24

Banbury mixing conditions of SAN with the coated carbon black E-100A-20 and E-100A-30.

| Product Code | Rotor Speed rpm | Start Temperature ° C. | Ram Pressure kg cm$^{-2}$ | Time Fluxes | Flux Temperature ° C. | Post Flux Mixing Time/s | Drop Temperature ° C. |
|---|---|---|---|---|---|---|---|
| E-100A-20-50 | 175 | 80 | 3 | 150 | 115 | 90 | 190 |
| E-100A-20-30 | 175 | 80 | 3 | 75 | 140 | 90 | 180 |
| E-100A-20-10 | 175 | 80 | 3 | 60 | 135 | 90 | 165 |
| E-100A-30-50 | 175 | 80 | 3 | 60 | 110 | 90 | 185 |
| E-100A-30-30 | 175 | 80 | 3 | 180 | 120 | 90 | 178 |
| E-100A-30-10 | 175 | 80 | 3 | 120 | 135 | 90 | 170 |

TABLE 25

Blend data

| Product Code | Theoretical CB content % | Ash content N2/900° C. % | MFI at 5 kg, 230° C. g/10 min | MFI at 21.6 kg, 230° C. g/10 min | Screen 40 mesh specs | Screen 100 mesh specs |
|---|---|---|---|---|---|---|
| E-100A-20-50 | 34.4 | 35.3 | 0.4 | 15.2 | 0 | 6 |
| E-100A-20-30[a] | 20.6 | 21.23 | 4.4 | 85 | 0 | 3 |
| E-100A-20-10[a] | 6.9 | 6.94 | 12.3 | 183 | 0 | 3 |
| E-100A-30-50 | 34.4 | 35.6 | 0.0 | 3.16 | 1 | 25 |
| E-100A-30-30[a] | 20.6 | 21.1 | 3.1 | 59.25 | 0 | 19 |
| E-100A-30-10[a] | 6.9 | 7.1 | 8.8 | 113.00 | 3 | 50 |

[a]Compositions injection molded

Processing of the compounds was carried out as described earlier. Tensile specimens were produced according to ASTM D638 standard. The impact specimens were prepared and tested according to ASTM D5045-95. Rectangular bars (45 mm 610 mm 63 mm) were also prepared for analysis by Dynamic Mechanical Thermal Analysis (DMTA).

The injection moulding of the tensile specimens was carried out according to ISO R527 type II for some of the formulations described in Table 6. The formulations E-100A-30-10 and E-100A-30-30 were also injection moulded using the dimensions recommended by ISO R527 type I.

Tensile tests were performed according to ASTM D638 using an Instron 1122 tensile testing machine in order to obtain the tensile properties of the various compounds. The tests were carried out using a gauge length of 64 mm and a crosshead speed of 10 mm min$^{-1}$. An Instron 2630-30 extensometer was used to measure strains up to 10% accurately. A total of six specimens were tested for each material and the mean values of the mechanical properties calculated.

Table 26 shows the tensile properties of the compounds. The values of the SAN and uncoated carbon black-filled SAN compounds are also given for comparative purposes.

TABLE 26

Tensile properties of the filled and unfilled SAN specimens prepared by compression molding.

| Material | wt(CB)[a]/% | E[b]/GPa | $\sigma_u$[c]/MPa | $\epsilon_u$[d]/% |
|---|---|---|---|---|
| S-nf-0-10 | 6.9 | 2.36 ± 0.18 | 43.1 ± 1.5 | 2.1 ± 0.1 |
| S-nf-0-30 | 20.6 | 3.16 ± 0.14 | 43.6 ± 1.8 | 1.3 ± 0.2 |
| S-nf-0-50 | 34.4 | 3.56 ± 0.31 | 29.3 ± 4.6 | 0.8 ± 0.1 |
| E-100A-10-10 | 6.9 | 2.82 ± 0.21 | 47.8 ± 2.4 | 1.9 ± 0.1 |
| E-100A-10-30 | 20.6 | 2.91 ± 0.15 | 40.9 ± 4.5 | 1.6 ± 0.1 |
| E-100A-10-50 | 34.4 | 3.31 ± 0.10 | 23.3 ± 1.6 | 0.7 ± 0.1 |
| E-100A-20-10 | 6.9 | 2.89 ± 0.07 | 49.2 ± 1.6 | 1.9 ± 0.1 |
| E-100A-20-30 | 20.6 | 2.93 ± 0.02 | 34.6 ± 3.6 | 1.2 ± 0.1 |
| E-100A-20-50 | 34.4 | 3.43 ± 0.03 | 35.0 ± 2.4 | 1.1 ± 0.1 |
| E-100A-30-10 | 6.9 | 2.77 ± 0.02 | 48.6 ± 1.9 | 2.2 ± 0.1 |
| E-100A-30-30 | 20.6 | 2.90 ± 0.30 | 38.7 ± 4.7 | 1.5 ± 0.1 |
| E-100A-30-50 | 34.4 | 3.23 ± 0.03 | 24.3 ± 2.0 | 0.9 ± 0.1 |
| SAN1 | 0 | 2.02 ± 0.43 | 58.0 ± 8.5 | 3.4 ± 1.0 |

[a]wt(CB) is the theoretical carbon black content in %
[b]E is the tensile modulus calculated as the secant at 0.1% elongation
[c]$\sigma_u$ is the ultimate tensile stress
[d]$\epsilon_u$ is the ultimate tensile strain

TABLE 27

Tensile properties of the filled and unfilled SAN injection-moulded tensile specimens according to ISO R527 type II. The values between parenthesis corresponds to specimens ISO R527 type I and they were tested using a gauge length of 120 mm.

| Material | wt(CB)[a]/% | E[b]/GPa | $\sigma_u$[c]/MPa | $\epsilon_u$[d]/% |
|---|---|---|---|---|
| S-nf-0-30 | 20.6 | 3.37 ± 0.15 | 46.7 ± 7.1 | 1.2 ± 0.4 |
| E-100A-10-10 | 6.9 | 3.59 ± 0.10 | 55.9 ± 6.1 | 1.8 ± 0.2 |
| E-100A-10-30 | 20.6 | 3.76 ± 0.02 | 46.1 ± 2.5 | 1.3 ± 0.1 |
| E-100A-20-10 | 6.9 | 3.23 ± 0.08 | 55.4 ± 4.7 | 1.8 ± 0.2 |
| E-100A-20-30 | 20.6 | 3.61 ± 0.17 | 47.0 ± 0.7 | 1.4 ± 0.1 |
| E-100A-30-10 | 6.9 | 3.01 ± 0.14 | 65.4 ± 5.0 | 2.3 ± 0.2 |
|  |  | (3.02 ± 0.10) | (46.1 ± 2.1) | (1.8 ± 0.1) |
| E-100A-30-30 | 20.6 | 3.22 ± 0.18 | 58.9 ± 2.8 | 2.0 ± 0.2 |
|  |  | (3.18 ± 0.06) | (45.3 ± 3.1) | (1.6 ± 0.1) |
| SAN1 | 0 | 3.01 ± 0.07 | 79.7 ± 1.4 | 3.1 ± 0.1 |

[a]wt(CB) is the theoretical carbon black content in %
[b]E is the tensile modulus calculated as the secant at 0.1% elongation
[c]$\sigma_u$ is the ultimate tensile stress
[d]$\epsilon_u$ is the ultimate tensile strain Tables 26 and 27 showed that Young's modulus, ultimate stress and ultimate strain follow the same trend with carbon black content as those described for the compression molded specimens, however it is noticeable that there are significant differences between the behaviour of the coated samples E-100A-30 and the others (E-100A-10 and E-100A-20). Samples containing E-100A-30 display slightly lower values of Young's modulus and significantly higher values of ultimate stress and strain. This indicates that the ratio of polymer-coating to carbon black (~0.4 g polymer/1 g CB) used in these samples is appropriate for changing the mechanical properties. This same ratio of polymer-coating to carbon black was also used in the solution-coated blacks which displayed improved mechanical properties.

Three-point bend single edge-notched impact testing was performed using a Ceast 6545 digital pendulum, (release angle set at 15°) interfaced to a MK4 microprocessor together with a PC. The standard specimen was a single edge-notched beam loaded in three-point bending with a support span S (=96.0 mm) nominally equal to four times the width, W.

The notch-to-depth ratio, (a/w) was 0.50±0.05 and for each material at least 6 specimens were analyzed and mean results calculated. The measured values of the fracture energy, $G_{Ic}$, as calculated from ASTM D 5045-95, are presented in Table 28.

TABLE 28

Variation of fracture energy $G_{Ic}$ with weight percentage of carbon black, wt(CB).

| Material | wt(CB)[a]/% | $G_{Ic}$[b]/Jm$^{-2}$ |
|---|---|---|
| S-nf-0-10 | 6.9 | 315 ± 27 |
| S-nf-0-30 | 20.6 | 272 ± 63 |
| S-nf-0-50 | 34.4 | 201 ± 24 |
| E-100A-10-10 | 6.9 | 288 ± 38 |
| E-100A-10-30 | 20.6 | 228 ± 21 |
| E-100A-10-50 | 34.4 | 173 ± 4 |
| E-100A-20-10 | 6.9 | 322 ± 30 |
| E-100A-20-30 | 20.6 | 214 ± 34 |
| E-100A-20-50 | 34.4 | 168 ± 10 |
| E-100A-30-10 | 6.9 | 367 ± 40 |
| E-100A-30-30 | 20.6 | 286 ± 39 |
| E-100A-30-50 | 34.4 | 223 ± 15 |
| SAN1 | 0 | 1104 ± 152 |

[a]wt(CB) is the theoretical carbon black content in %
[b]$G_{Ic}$ is the fracture energy as calculated from ASTM D 5045-95

There is a significant decrease in the $G_{Ic}$ value with increasing carbon black content for the uncoated carbon black compounds. This same trend was observed for the emulsion-coated carbon blacks. However, although there are not significant differences between the carbon blacks coated with different thicknesses, plotting the values with different scales show slightly higher values of the fracture energy for the 30 nm coating carbon black compounds; this difference in behavior of the 30 nm coating thickness in comparison to 10 and 20 nm was also observed in the tensile properties of the injected specimens.

Example 8

Another three preparations were carried out. The grade of carbon black in these preparations, also Sterling but with single treatment (—$C_6H_4SO_3Na$), was kept constant. The variable in this set of preparations was the polymer-coating composition, butyl acrylate (BA):allyl methacrylate (ALMA) which was used in different ratio. Also new monomers, such as methyl methacrylate (MMA) and styrene (S), were introduced. These variables allow us to study the effect on dispersibility and the mechanical properties of the coated CB-filled SAN by comparing the scaling-ups prepared with:

different grade of carbon black (dual vs single treatment)
different level of crosslinking agent (2 vs 1 mol % of ALMA)
different polymer-coating composition (BA:ALMA vs BA:ALMA:MMA:S)

The 30 nm coating thickness was selected in order to have a ratio of the weight percent coating polymer (wt % polymer) to weight percent carbon black (wt % CB) of approximately 0.4 g polymer/1 g CB. This ratio is similar to that used in the solution evaporation method [S—$NH_2$-20 (BA) and R—$NH_2$-20(BA)] which showed improved mechanical properties over the uncoated carbon black.

First, small-scale reactions were carried out in order to decide the suitable reactant compositions and reaction times. Kinetics studies were also carried out. The preliminary reaction procedure is as described in Example 7. Butyl acrylate (BA) was washed as described previously; methyl methacrylate (MMA, Aldrich, 98.0%) was used after being washed several times with 2% sodium hydroxide, and styrene (S, Aldrich, 98.0%) was used after distillation as described in the previous report. Allyl methacrylate was used as supplied. The carbon black (sulphonated Sterling 4620) was washed with methanol and dried to constant weight, and the initiator, ammonium persulphate (Aldrich, 99.0%) was used as supplied.

Polymerizations were carried out using a form of semi-continuous emulsion polymerisation. Table 29 shows the compositions of the most representative polymerizations.

TABLE 29

Formulations used for the coating of Sterling (—$C_6H_4SO_3Na$) with a 30 nm polymer-coating thickness.

| | Mass of component/g | | | |
|---|---|---|---|---|
| Component | E3 [E-16A-30][a] | E4 [E-16A-30] | E5 [E-16A-30(99BA)] | E6 [E-16A-30(94BA)] |
| Sterling | 50 | 50 | 50 | 50 |
| Water | 250 | 250 | 250 | 250 |
| Initiator | 3.51[c] | 4.94[d] | 4.91[d] | 4.92[d] |
| BA | 21.57 | 21.52 | 21.90 | 20.69 |
| ALMA | 0.46 | 0.43 | 0.22 | 0.22 |
| MMA | — | — | — | 0.71 |
| S | — | — | — | 0.45 |
| Conversion/%[b] | 51 | 100 | 100 | 100 |

[a]Figures in parentheses are the product code.
[b]Determined by Gas-Liquid Chromatography (GLC).
[c]2.1 g of initiator (in 25 ml of water) added in a continuos way after 2.5 hours reaction.
[d]4.18 g of initiator (in 25 ml of water) added in a continuos way after 2.5 hours reaction.

As Table 29 shows, with the amount of initiator used the polymerisation E3 did not go to complete reaction even after long reaction periods (10 hours). The level of initiator was the same as the one used for the same polymer-coating polymerisation but with different carbon black grade, dual treated Sterling (—$C_6H_4SO_3Na$/—$C_6H_4CH$=$CH_2$). This suggests that the second treatment carried out on the carbon black locks the surface of the black and consumes less initiator. The polymerization E3 was repeated (E4) but increasing the amount of initiator and in this case the conversion was complete. In polymerization E3 there is a rapid decrease of the instantaneous conversion in the initial stages of the reaction which eventually stabilizes at ~51%. The addition of extra initiator at 150 min does not has any significant effect on the conversion. Reaction E4 shows that after increasing the initiator level, the conversion reached 100%.

Polymerisation E5 is similar to E4 but in this case the BA:ALMA ratio was 99:1 mol %. The instantaneous conversions indicated that between the reaction time of 20–80 min, more than 90% conversion was achieved. This was followed by a decrease and as the addition of extra amount of initiator started the conversion increased again until 100% at approximately 220 minutes.

With these experiments it was concluded that the compositions of F4, E5 and E6 were the selected ones for the scaling-up of the coating process.

Two batches of the polymer-coated carbon black were prepared for each of the scaling-ups (E-16A-30, E-16A-30 (99BA) and E-16A-30(94BA)). The carbon black used was a washed and dried Sterling (—$C_6H_4SO_3Na$) (sample number T016A-84A) as previously mentioned: the monomers used for the coating in the scaling-up E-16A-30 and E-16A-30 (99BA) were butyl acrylate (BA) and allyl methacrylate (ALMA) in a ratio 98:2 and 99:1 mol % respectively. For the scaling-up E-16A-30(94BA) the monomers used were butyl acrylate (BA):allyl methacrylate (ALMA) methyl methacrylate (MMA):styrene (S) in a ratio 94:1:3:2 mol %. The targeted coating thickness was 30 nm. The polymerization procedure was as described previously. After the reaction, monitored by gas liquid chromatography (GLC), the products obtained were filtered off, dried and ground into fine powders.

TABLE 30

Composition details of the polymer-coated carbon black, grade Sterling (—$C_6H_4SO_3Na$)(sample number T016-84A), with a 30 nm coating thickness.

| | Polymer-Coating Composition | | | | Composition of Coated CB wt % | |
|---|---|---|---|---|---|---|
| | mol % | | | | Polymer- | Carbon |
| Sample Code | BA | ALMA | MMA | S | Coating | Black |
| E-16A-30 | 98 | 2 | — | — | 31.1 | 68.9 |
| E-16A-30(99BA) | 99 | 1 | — | — | 31.0 | 69.0 |
| E-16A-30(94BA) | 94 | 1 | 3 | 2 | 30.8 | 69.2 |

DSC experiments were performed on the reaction products in order to detect the coating polymer and to determine the glass transition temperature, $T_g$.

The DSC results showed that E-16A-30 and E-16A-30 (99BA) had a $T_g$ of −43° C. (similar to that obtained for the reaction E-100A-30 which was −44° C.). The scaling-up E-16A-30(94BA) had a $T_g$ of −30° C. This increase in the $T_g$ is due to the lower content of BA in the copolymer (94 mol %) and the presence of MMA and S which has a more glassy and less rubbery features than the BA.

The scaling-up products were also characterised by IR spectroscopy. The main feature of the IR spectra of the scaling-up samples were the peaks due to the presence of BA in the polymer coating (a strong peak at 1735 $cm_{-1}$ due to C=O stretching and a strong band at 1160 $cm^{-1}$ which is attributed to C—O stretching vibrations). Again die spectra present a high level of noise due to the carbon black. In the sample E-16A-30(94BA) the peaks due to the other monomers used in the coating (S, MMA or ALMA) are not evident because of the low ratio of these monomers compared with the BA.

Dispersibility experiments were also carried out on these scaling-up products. This simple experiment showed that E-16A-30. E-16A-30(99BA) and E-16A-30(94BA) sediment rapidly after dispersion in water indicating that the polymer was successfully coated onto the carbon black. The absence of a top layer on the water indicates that the polymer does not polymerise as a separate phase.

Other embodiments of the present invention will be apparent to those skilled in the art from consideration of the specification and practice of the invention disclosed herein. It is intended that the specification and examples be considered as exemplary only with a true scope and spirit of the invention being indicated by the following claims.

What is claimed is:

1. A polymer coated modified carbon product comprising a modified carbon product having at least one organic group, wherein said organic group is substituted with an ionic, ionizable, or polar group, or said organic group comprises at least aromatic group, wherein said aromatic group is directly attached to the carbon product, or both, and wherein the modified carbon product is a core and said polymer is a shell, wherein said shell has a thickness of about 1 nm or more.

2. The polymer coated modified carbon product of claim 1, wherein at least one polymer is present in a single layer.

3. The polymer coated modified carbon product of claim 2, wherein said carbon product is carbon black, graphite, vitreous carbon, activated carbon, activated chemical, carbon fiber, or mixtures thereof.

4. The polymer coated modified carbon product of claim 1, wherein at least one polymer is present in multiple layers, wherein the at least one polymer is the same or different in each of the layers.

5. The polymer coated modified carbon product of claim 1, wherein said organic group is substituted with an ionic, ionizable, or polar group.

6. The polymer coated modified carbon product of claim 5, wherein said carbon product is carbon black.

7. The polymer coated modified carbon product of claim 5, wherein said ionic, ionizable, or polar group is a sulfonic acid group or a salt thereof, a sulfinic acid group or a salt thereof, a carboxylic acid group or a salt thereof, a phosphonic acid group or a salt thereof, or a quaternary ammonium group.

8. The polymer coated modified carbon product of claim 1, wherein said organic group is a substituted or unsubstituted sulfophenyl group or a salt thereof, or the organic group is a substituted or unsubstituted (polysulfo)phenyl group or a salt thereof.

9. The polymer coated modified carbon product of claim 1, wherein said organic group is a substituted or unsubstituted sulfonaphthyl group or a salt thereof, or the organic group is a substituted or unsubstituted (polysulfo)naphthyl group or a salt thereof.

10. The polymer coated modified carbon product of claim 1, wherein said organic group is a substituted or unsubstituted p-sulfophenyl or a salt thereof.

11. The polymer coated modified carbon product of claim 1, wherein said organic group is p-$C_6H_4SO_3Na$.

12. The polymer coated modified carbon product of claim 1, wherein said carbon product is carbon black, graphite, vitreous carbon, activated carbon, activated charcoal, carbon fiber, or mixtures thereof.

13. The polymer coated modified carbon product of claim 1, wherein said carbon product is carbon black.

14. The polymer coated modified carbon product of claim 1, wherein said organic group comprises at least one aromatic group, wherein said aromatic group is directly attached to the carbon product.

15. The polymer coated modified carbon product of claim 1, wherein said organic group comprises a $C_1$–$C_{12}$ alkyl group, wherein said alkyl group is directly attached to the carbon product.

16. The polymer coated modified carbon product of claim 1, wherein said polymer is polyethylene, poly(vinylchloride), polyisobutylene, polystyrene, polycaprolactam (nylon), polyisoprene, polyamides, polycarbonates, polyelectrolytes, polyesters, polyethers, (polyhydroxy)benzenes, polyimides, polymers containing sulfur, polyolefins, polymethylbenzenes, polystyrene, styrene copolymers, acetal polymers, acrylic polymers, acrylonitrile polymers and copolymers, polyolefins containing halogen, fluoropolymers, ionomeric polymers, polymers containing ketone group(s), liquid crystal polymers, polyamide-imides, polymers containing olefinic double bond(s), polyolefin copolymers, polyphenylene oxides, polyurethanes, thermoplastic elastomers, silicone polymers, alkyd, epoxy, unsaturated polyester, vinyl ester, or urea-, melamine-, or phenol-formaldehyde resins.

17. The polymer coated modified carbon product of claim 1, wherein said at least one polymer substantially coats the modified carbon product.

18. The polymer coated modified carbon product of claim 1, wherein said at least one polymer has a thickness of from about 1 nm to about 100 nm.

19. The polymer coated modified carbon product of claim 1, wherein the modified carbon product is an aggregate comprising a carbon phase and a silicon-containing species phase.

20. The polymer coated modified carbon product of claim 19, further comprising an organic group attached to said modified carbon product.

21. The polymer coated modified carbon product of claim 1, wherein the modified carbon product is an aggregate comprising a carbon phase and a metal-containing species phase.

22. The polymer coated modified carbon product of claim 21, further comprising an organic group attached to said modified carbon product.

23. The polymer coated modified carbon product of claim 1, wherein the modified carbon product comprises at least one partially silica coated carbon black.

24. The polymer coated modified carbon product of claim 23, further comprising an organic group attached to said modified carbon product.

25. The polymer coated modified carbon product of claim 1, wherein said at least one modified carbon product further comprises at least one second organic group attached to the carbon product.

26. The polymer coated modified carbon product of claim 25, wherein said at least one second organic group comprises at least one aromatic group substituted with an alkenyl group.

27. A polymer coated modified carbon product comprising at least one modified carbon product coated at least partially with at least one polymer, wherein the modified carbon product is a core and said polymer is a shell, and wherein said modified carbon product comprises at least one modified carbon product having attached at least one organic group; at least one aggregate comprising a carbon phase and a silicon-containing species phase; at least one aggregate comprising a carbon phase and a metal-containing species phase; or at least one partially silica coated carbon black, wherein said shell has a thickness of about 1 nm or more.

28. The polymer coated modified carbon product of claim 27, wherein said modified carbon product comprises at least one organic group attached to at least one carbon product.

29. The polymer coated modified carbon product of claim 28, wherein said at least one organic group comprises at least one aromatic group or at least one $C_1$–$C_{12}$ alkyl group directly attached to the carbon product.

30. The polymer coated modified carbon product of claim 27, wherein the modified carbon product is an aggregate comprising a carbon phase and a silicon-containing species phase, optionally having an organic group attached thereto.

31. The polymer coated carbon product of claim 27, wherein the modified carbon product comprises an aggregate comprising a carbon phase and a metal-containing species phase, optionally having an organic group attached thereto.

32. A plurality of polymer coated modified carbon products, each of the products comprising a modified carbon product being substantially coated with at least one polymer, wherein each modified carbon product is a core and said polymer is a shell, wherein said shell has a thickness of about 1 nm or more.

33. A plurality of polymer coated modified carbon products, each of the products comprising a modified carbon product having a substantially uniform thickness of polymer coating, wherein each modified carbon product is a core and said polymer coating is a shell, wherein said shell has a thickness of about 1 nm or more.

34. A polymeric product comprising the polymer coated modified carbon product of claim 1 dispersed in a polymer matrix.

35. A polymeric masterbatch comprising the polymer coated modified carbon product of claim 1, polymer, and wax.

36. A polymeric masterbatch comprising the polymer coated modified carbon product of claim 1.

37. A method to increase the tensile strength of a polymeric product comprising introducing a sufficient amount of the polymer coated modified carbon product of claim 1 during formation of the polymeric product.

38. A method of making the polymer coated modified carbon product of claim 1 by combining at least one polymer and at least one modified carbon product via an in situ polymerization process or deposition from a solution or dispersion of a preformed polymer.

39. A polymeric product comprising the polymer coated modified carbon product of claim 1 dispersed in a polymer matrix.

40. A polymeric product comprising the polymer coated modified carbon product of claim 2 dispersed in a polymer matrix.

41. A polymeric product comprising the polymer coated modified carbon product of claim 4 dispersed in a polymer matrix.

42. A polymeric product comprising the polymer coated modified carbon product of claim 5 dispersed in a polymer matrix.

43. A polymeric product comprising the polymer coated modified carbon product of claim 12 dispersed in a polymer matrix.

44. A polymeric product comprising the polymer coated modified carbon product of claim 16 dispersed in a polymer matrix.

45. The polymer coated modified carbon product of claim 1, further comprising one or more organic groups attached to the carbon product.

46. An article comprising the polymeric product of claim 34.

47. An article comprising the polymeric product of claim 39.

48. An article comprising the polymeric product of claim 40.

49. An article comprising the polymeric product of claim 41.

50. An article comprising the polymeric product of claim 42.

51. An article comprising the polymeric product of claim 43.

52. An article comprising the polymeric product of claim 44.

* * * * *